US009762314B2

(12) United States Patent
Ulupinar et al.

(10) Patent No.: US 9,762,314 B2
(45) Date of Patent: Sep. 12, 2017

(54) HANDOFF FOR NON-GEOSYNCHRONOUS SATELLITE COMMUNICATION

(71) Applicant: QUALCOMM Incorporated, San Diego, CA (US)

(72) Inventors: Fatih Ulupinar, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/856,933

(22) Filed: Sep. 17, 2015

(65) Prior Publication Data

US 2016/0323032 A1 Nov. 3, 2016

Related U.S. Application Data

(60) Provisional application No. 62/156,063, filed on May 1, 2015.

(51) Int. Cl.
H04W 36/00 (2009.01)
H04B 7/185 (2006.01)
H04W 84/06 (2009.01)

(52) U.S. Cl.
CPC .... H04B 7/18541 (2013.01); H04W 36/0083 (2013.01); *H04W 84/06* (2013.01)

(58) Field of Classification Search
None
See application file for complete search history.

(56) References Cited

U.S. PATENT DOCUMENTS 5,483,664 A * 1/1996 Moritz ............... H04B 7/18541
455/12.1
5,500,648 A 3/1996 Maine et al.
(Continued)

FOREIGN PATENT DOCUMENTS

EP 0637142 A1 2/1995
EP 0808034 A2 11/1997

OTHER PUBLICATIONS

International Search Report and Written Opinion—PCT/US2016/029050—ISA/EPO—Jul. 19, 2016.
(Continued)

*Primary Examiner* — Daniel Lai
(74) *Attorney, Agent, or Firm* — Loza & Loza, LLP

(57) ABSTRACT

Various aspects of the disclosure relate to handoff of a user terminal in communication with a gateway through a satellite in a non-geosynchronous satellite communication system. In some aspects, a gateway and a user terminal use a satellite and beam transition table to determine when to handoff the user terminal from one beam to another and/or from one satellite to another. In some aspects, a user terminal sends capability information, location information, or other information to a gateway whereby, based on this information, the gateway generates a satellite and beam transition table and/or selects a handoff procedure for the user terminal. In some aspects, handoff of a user terminal to a different satellite involves the user terminal conducting satellite signal measurements and sending a measurement message to the gateway. In some aspects, the gateway generates a new satellite and beam transition table as a result of receiving a measurement message.

47 Claims, 23 Drawing Sheets

(56) References Cited

U.S. PATENT DOCUMENTS

| | | | |
|---|---|---|---|
| 5,574,968 A | 11/1996 | Olds et al. | |
| 5,912,641 A * | 6/1999 | Dietrich | H04B 7/18536 |
| | | | 342/353 |
| 5,966,640 A | 10/1999 | Leath et al. | |
| 5,999,797 A | 12/1999 | Zancho et al. | |
| 6,023,242 A | 2/2000 | Dixon | |
| 6,868,270 B2 | 3/2005 | Dent | |
| 6,920,323 B1 * | 7/2005 | Grayson | H04B 7/18534 |
| | | | 370/324 |
| 7,136,620 B2 | 11/2006 | Wang | |
| 7,558,226 B2 | 7/2009 | Anderson et al. | |
| 8,223,719 B2 | 7/2012 | Hong et al. | |
| 2002/0052180 A1 | 5/2002 | Ravishankar et al. | |
| 2004/0014452 A1 | 1/2004 | Lim et al. | |
| 2007/0010252 A1 * | 1/2007 | Balachandran | H04W 36/0033 |
| | | | 455/437 |
| 2007/0135040 A1 | 6/2007 | Draim | |
| 2009/0041246 A1 | 2/2009 | Kitazoe | |
| 2011/0013542 A1 | 1/2011 | Yu et al. | |
| 2013/0051360 A1 | 2/2013 | Monte et al. | |
| 2014/0045437 A1 | 2/2014 | Keskitalo | |
| 2014/0057634 A1 * | 2/2014 | Chang | H04W 36/0083 |
| | | | 455/437 |
| 2014/0128075 A1 * | 5/2014 | Da Silva | H04W 36/30 |
| | | | 455/436 |
| 2015/0381263 A1 * | 12/2015 | Lejnell | H04B 7/18508 |
| | | | 370/316 |
| 2016/0323800 A1 | 11/2016 | Ulupinar et al. | |

OTHER PUBLICATIONS

International Search Report and Written Opinion—PCT/US2016/030263—ISA/EPO—Jul. 19, 2016.

* cited by examiner

HANDOFF FOR NON-GEOSYNCHRONOUS SATELLITE COMMUNICATION

CROSS-REFERENCE TO RELATED APPLICATION(S)

This application claims priority to and the benefit of provisional patent application No. 62/156,063 filed in the U.S. Patent and Trademark Office on May 1, 2015, the entire content of which is incorporated herein by reference.

BACKGROUND

Various aspects described herein relate to satellite communication, and more particularly but not exclusively, to handoff for non-geosynchronous satellite communication.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the Internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beamforming antennas. Each beam covers a particular geographic region within the footprint. Beams may be directed so that more than one beam from the same satellite covers the same specific geographic region.

Geosynchronous satellites have long been used for communication. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire Earth or at least large parts of the Earth. In non-geosynchronous satellite-based systems, such as LEO satellite-based systems, the satellites move relative to a communication device (such as a gateway or a user terminal (UT)) on the ground. Thus, a UT may be handed-off from one satellite to another.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

Aspects of the disclosure are directed to handoff for non-geosynchronous satellite communication.

In one aspect, the disclosure provides an apparatus configured for communication that includes a memory device and a processing circuit coupled to the memory device. The processing circuit is configured to: generate satellite and beam transition information that specifies a time to start and a time to terminate communication with a particular beam of a particular satellite; and send the satellite and beam transition information to a user terminal.

Another aspect of the disclosure provides a method for communication including: generating satellite and beam transition information that specifies a time to start and a time to terminate communication with a particular beam of a particular satellite; and sending the satellite and beam transition information to a user terminal Another aspect of the disclosure provides an apparatus configured for communication. The apparatus including: means for generating satellite and beam transition information that specifies a time to start and a time to terminate communication with a particular beam of a particular satellite; and means for sending the satellite and beam transition information to a user terminal.

Another aspect of the disclosure provides a non-transitory computer-readable medium storing computer-executable code, including code to: generate satellite and beam transition information that specifies a time to start and a time to terminate communication with a particular beam of a particular satellite; and send the satellite and beam transition information to a user terminal.

In one aspect, the disclosure provides an apparatus configured for communication that includes a memory device and a processing circuit coupled to the memory device. The processing circuit is configured to: receive satellite and beam transition information that specifies a time to start and a time to terminate communication with a particular beam of a particular satellite; and perform handoff to the particular beam of the particular satellite based on the satellite and beam transition information.

Another aspect of the disclosure provides a method for communication including: receiving satellite and beam transition information that specifies a time to start and a time to terminate communication with a particular beam of a particular satellite; and performing handoff to the particular beam of the particular satellite based on the satellite and beam transition information.

Another aspect of the disclosure provides an apparatus configured for communication. The apparatus including: means for receiving satellite and beam transition information that specifies a time to start and a time to terminate communication with a particular beam of a particular satellite; and means for performing handoff to the particular beam of the particular satellite based on the satellite and beam transition information.

Another aspect of the disclosure provides a non-transitory computer-readable medium storing computer-executable code, including code to: receive satellite and beam transition information that specifies a time to start and a time to terminate communication with a particular beam of a particular satellite; and perform handoff to the particular beam of the particular satellite based on the satellite and beam transition information.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

The disclosure relates in some aspects to handoff of a user terminal that is in communication with a satellite network portal (also referred to as a gateway) via a satellite of a non-geosynchronous satellite communication system. In some implementations, the satellite communication system is a low-earth orbit (LEO) satellite communication system for communicating data, voice, video, or other information. The satellite network portal and the user terminal use a satellite and beam transition table to determine when to handoff the user terminal from one beam to another and/or from one satellite to another. In some aspects, the user terminal may send capability information, location information, or other information to the satellite network portal whereby, based on this information, the satellite network portal generates a satellite and beam transition table and/or selects a handoff procedure for the user terminal. The user terminal may also conduct satellite signal measurements and send a corresponding measurement message to the satellite network portal. The satellite network portal may then generate a new satellite and beam transition table as a result of receiving the measurement message. Various other aspects of the disclosure will also be described below in further detail.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
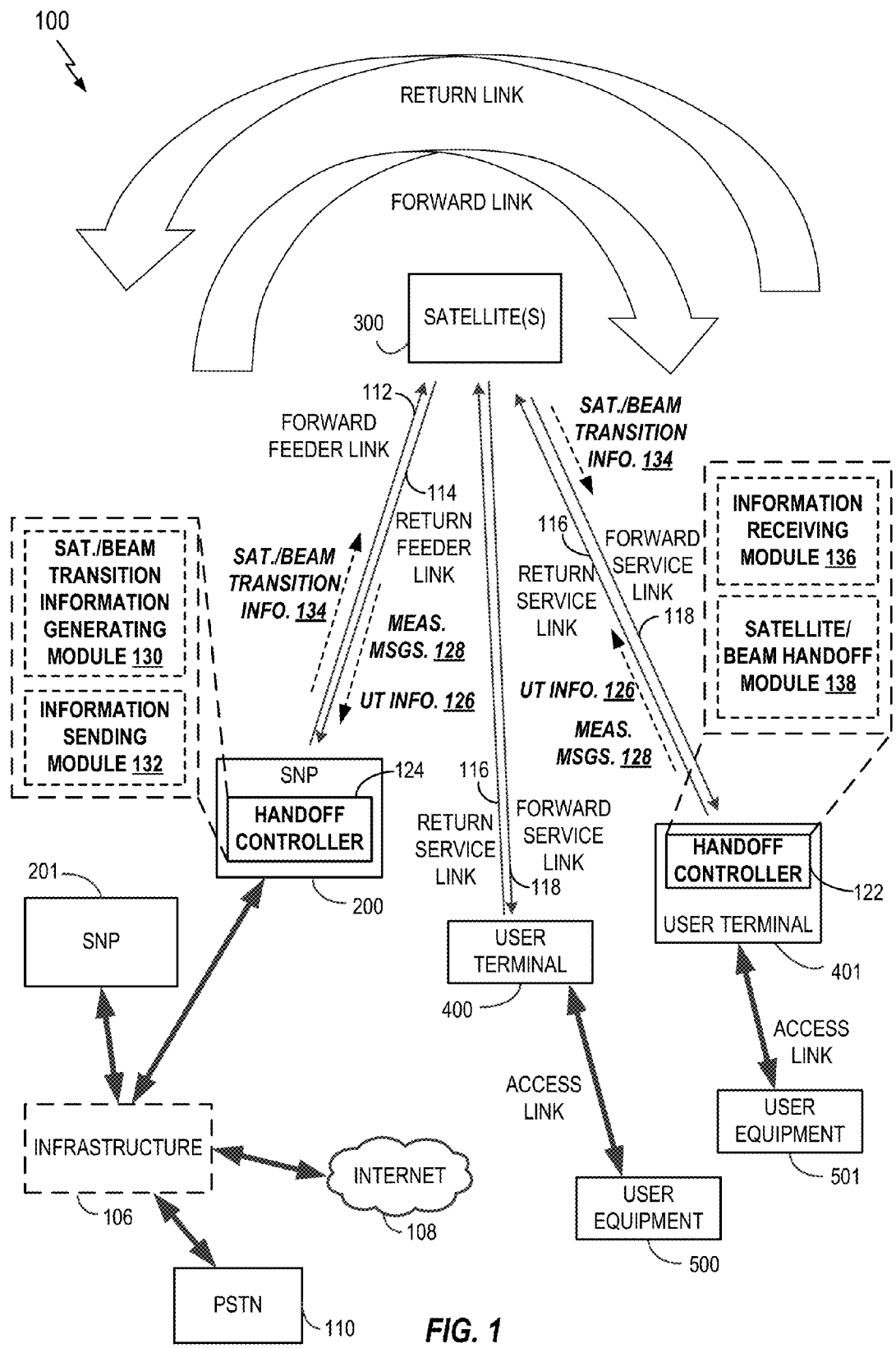
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), an SNP 200 (e.g., corresponding to a satellite gateway) in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The SNP 200 may have access to the Internet 108 or one or more other types of public, semiprivate or private networks. In the example illustrated in FIG. 1, the SNP 200 is in communication with infrastructure 106, which is capable of accessing the Internet 108 or one or more other types of public, semiprivate or private networks. The SNP 200 may also be coupled to various types of communication backhaul, including, for example, landline networks such as optical fiber networks or public switched telephone networks (PSTN) 110. Further, in alternative implementations the SNP 200 may interface to the Internet 108, PSTN 110, or one or more other types of public, semiprivate or private networks without using the infrastructure 106. Still further, the SNP 200 may communicate with other SNPs, such as the SNP 201 through the infrastructure 106 or alternatively may be configured to communicate to the SNP 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the SNP 200 in both directions are called feeder links, whereas communication between the satellite and each of the UTs 400 and 401 in both directions are called service links. A signal path from the satellite 300 to a ground station, which may be the SNP 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the SNP 200 and terminating at the UT 400 through the satellite 300 is called a forward link, whereas a communication link in a direction originating from the UT 400 and terminating at the SNP 200 through the satellite 300 is called a return link or a reverse link. As such, the signal path from the SNP 200 to the satellite 300 is labeled a "Forward Feeder Link" 112 whereas the signal path from the satellite 300 to the SNP 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

A handoff controller 122 of the UT 401 and a handoff controller 124 of the SNP 200 cooperate to control handoff of the UT 401 from one satellite or beam to another. Other components of the satellite communication system 100 may include corresponding handoff controllers as well. However, handoff controllers are only illustrated for the UT 401 and the SNP 200 to reduce the complexity of FIG. 1.

The handoff controller 122 sends UT information 126 (e.g., including UT location and capabilities information) and measurement messages 128 (e.g., including satellite measurement information) to the handoff controller 124. A satellite/beam transition information generating module 130 of the handoff controller 124 generates satellite/beam transition information (e.g., a table) indicative of handoff timing for the UT 401. In some aspects, the satellite/beam transition information generating module 130 may generate the satellite/beam transition information based, at least in part, on the UT information 126 and the measurement messages 128 received from the UT 401, satellite locations over time (obtained from ephemeris data), satellite beam patterns, and satellite beam turn-on and turn-off schedules. An information sending module 132 sends this satellite/beam transition information 134 to the handoff controller 122 via the current satellite 300.

An information receiving module 136 of the handoff controller 122 receives this satellite/beam transition information 134 via the current satellite 300. A satellite/beam handoff module 138 of the handoff controller 122 can then control handoff of the UT 401 based on the received satellite/beam transition information.

Figure 2:
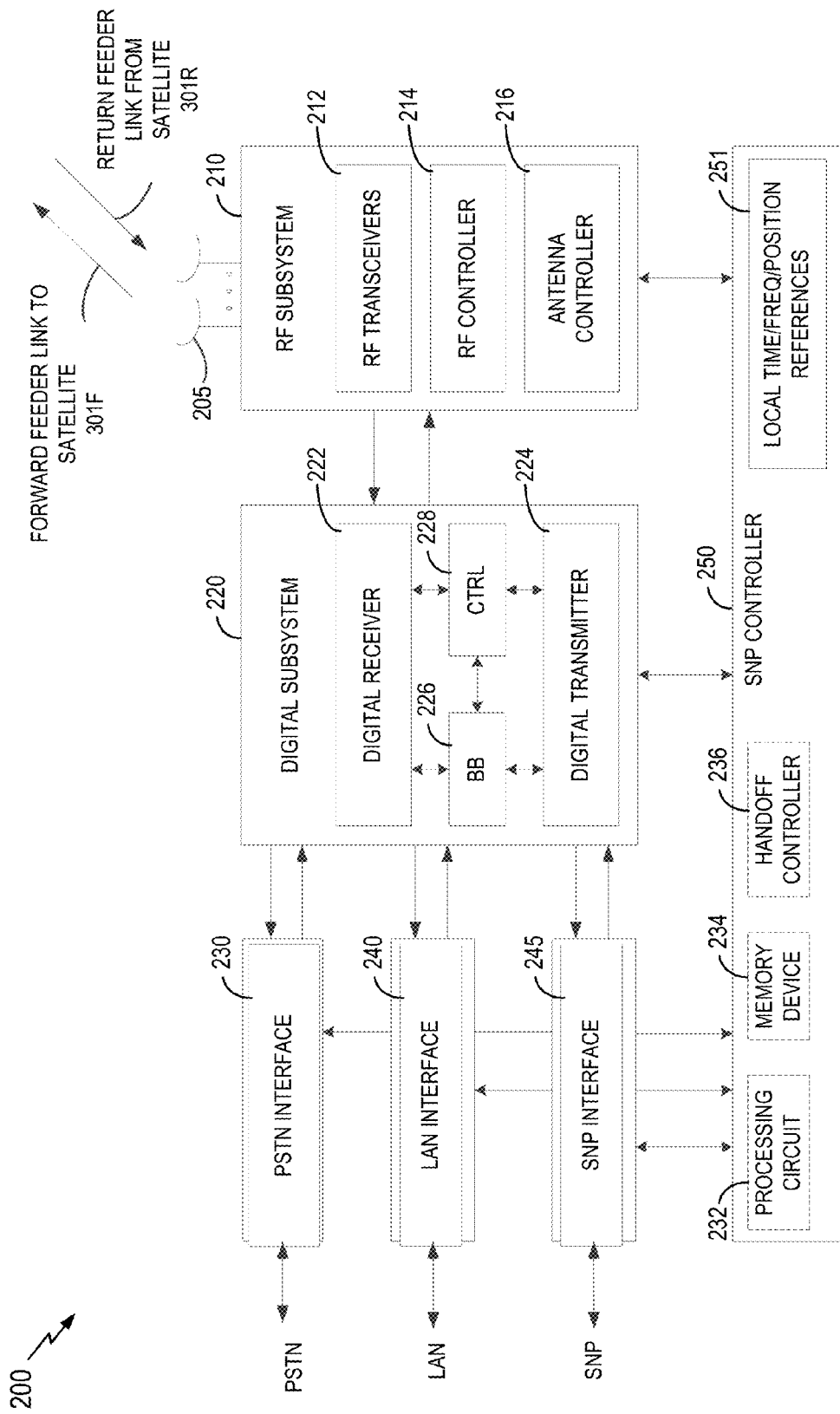
FIG. 2 is a block diagram of one example of a satellite network portal (SNP) of FIG. 1 in accordance with some aspects of the disclosure.

FIG. 2 is an example block diagram of the SNP 200, which also can apply to the SNP 201 of FIG. 1. The SNP 200 is shown to include a number of antennas 205, an RF subsystem 210, a digital subsystem 220, a Public Switched Telephone Network (PSTN) interface 230, a Local Area Network (LAN) interface 240, an SNP interface 245, and an SNP controller 250. The RF subsystem 210 is coupled to the antennas 205 and to the digital subsystem 220. The digital subsystem 220 is coupled to the PSTN interface 230, to the LAN interface 240, and to the SNP interface 245. The SNP controller 250 is coupled to the RF subsystem 210, the digital subsystem 220, the PSTN interface 230, the LAN interface 240, and the SNP interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the SNP 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the SNP 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The SNP interface 245 may provide communication signals to, and receive communication signals from, one or more other SNPs associated with the satellite communication system 100 of FIG. 1 (and/or to/from SNPs associated with other satellite communication systems, not shown for simplicity). For some implementations, the SNP interface 245 may communicate with other SNPs via one or more dedicated communication lines or channels (not shown for simplicity). For other implementations, the SNP interface 245 may communicate with other SNPs using the PSTN 110 and/or other networks such as the Internet 108 (see also FIG. 1). For at least one implementation, the SNP interface 245 may communicate with other SNPs via the infrastructure 106.

Overall SNP control may be provided by the SNP controller 250. The SNP controller 250 may plan and control utilization of the satellite 300's resources by the SNP 200. For example, the SNP controller 250 may analyze trends, generate traffic plans, allocate satellite resources, monitor (or track) satellite positions, and monitor the performance of the SNP 200 and/or the satellite 300. The SNP controller 250 may also be coupled to a ground-based satellite controller (not shown for simplicity) that maintains and monitors orbits of the satellite 300, relays satellite usage information to the SNP 200, tracks the positions of the satellite 300, and/or adjusts various channel settings of the satellite 300.

For the example implementation illustrated in FIG. 2, the SNP controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the SNP 200 with each other and/or with the satellite(s) 300. The local time, frequency, and position references 251 may also provide position information (e.g., ephemeris data) of the satellite(s) 300 to the various components of the SNP 200. Further, although depicted in FIG. 2 as included within the SNP controller 250, for other implementations, the local time, frequency, and the position references 251 may be a separate subsystem that is coupled to the SNP controller 250 (and/or to one or more of the digital subsystem 220 and the RF subsystem 210).

Although not shown in FIG. 2 for simplicity, the SNP controller 250 may also be coupled to a network control center (NCC) and/or a satellite control center (SCC). For example, the SNP controller 250 may allow the SCC to communicate directly with the satellite(s) 300, for example, to retrieve ephemeris data from the satellite(s) 300. The SNP controller 250 may also receive processed information (e.g., from the SCC and/or the NCC) that allows the SNP controller 250 to properly aim its antennas 205 (e.g., at the appropriate satellite(s) 300), to schedule beam transmissions, to coordinate handoffs, and to perform various other well-known functions.

The SNP controller 250 may include one or more of a processing circuit 232, a memory device 234, or a handoff controller 236 that independently or cooperatively perform handoff-related operations for the SNP 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the handoff controller 236 is configured (e.g., programmed) to perform some or all of these operations. Although depicted in FIG. 2 as included within the SNP controller 250, for other implementations, one or more of the processing circuit 232, the memory device 234, or the handoff controller 236 may be a separate subsystem that is coupled to the SNP controller 250 (and/or to one or more of the digital subsystem 220 and the RF subsystem 210).

Figure 3:
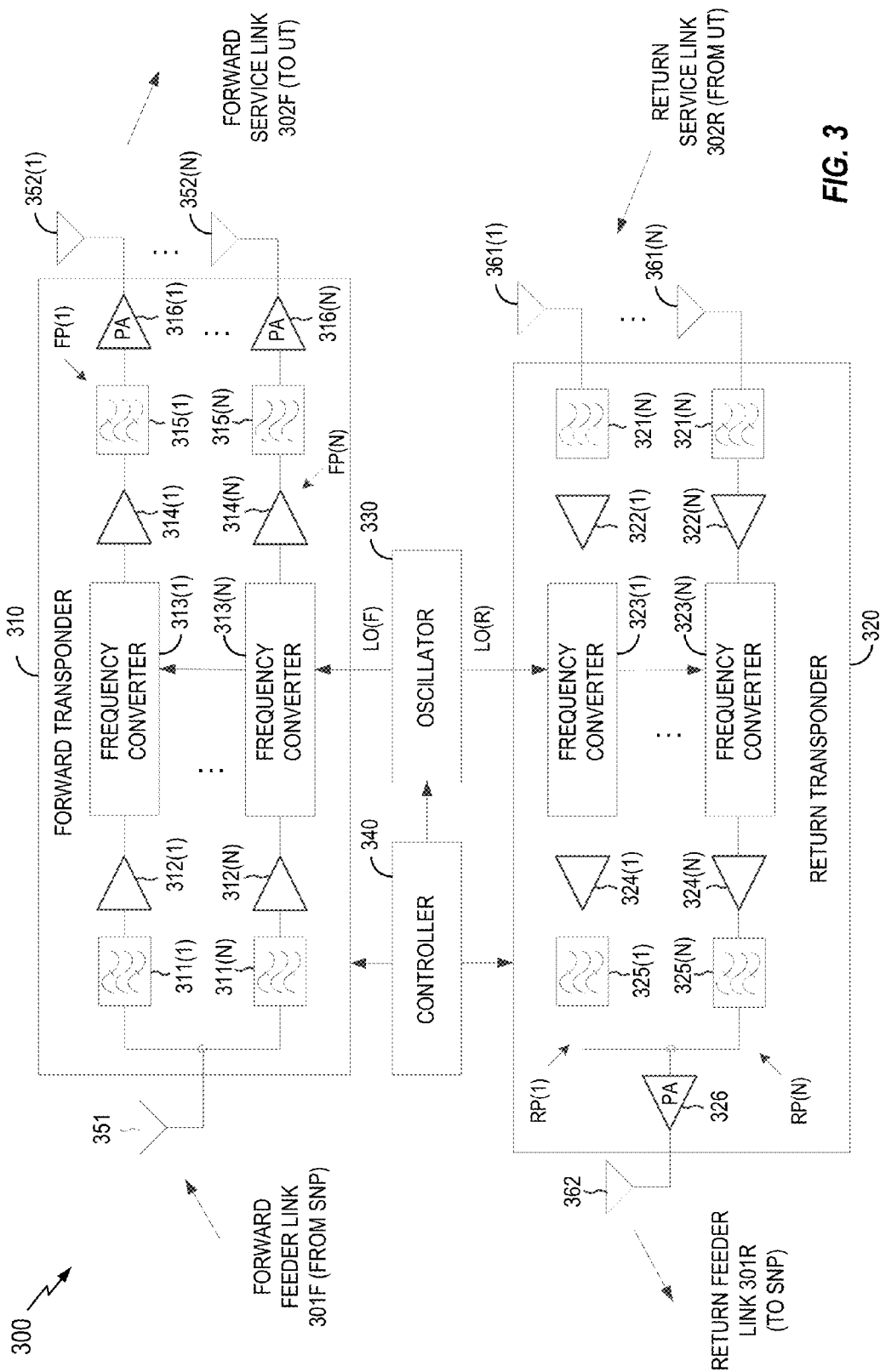
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the SNP 200 and the UT 400. It will be appreciated that the disclosure is not limited to any specific satellite configuration and any satellite or combinations of satellites that can provide the functional connection between the SNP 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the SNP 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the SNP 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the SNP 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the SNP 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the SNP 200.

The controller 340, which is coupled to the forward transponder 310, the return transponder 320, and the oscillator 330, may control various operations of the satellite 300 including (but not limited to) channel allocations. In one aspect, the controller 340 may include a memory (not shown) coupled to a processing circuit (e.g., a processor). The memory may include a non-transitory computer-readable medium (e.g., one or more nonvolatile memory elements, such as an EPROM, an EEPROM, a Flash memory, a hard drive, etc.) storing instructions that, when executed by the processing circuit, cause the satellite 300 to perform operations including (but not limited to) those described herein.

Figure 4:
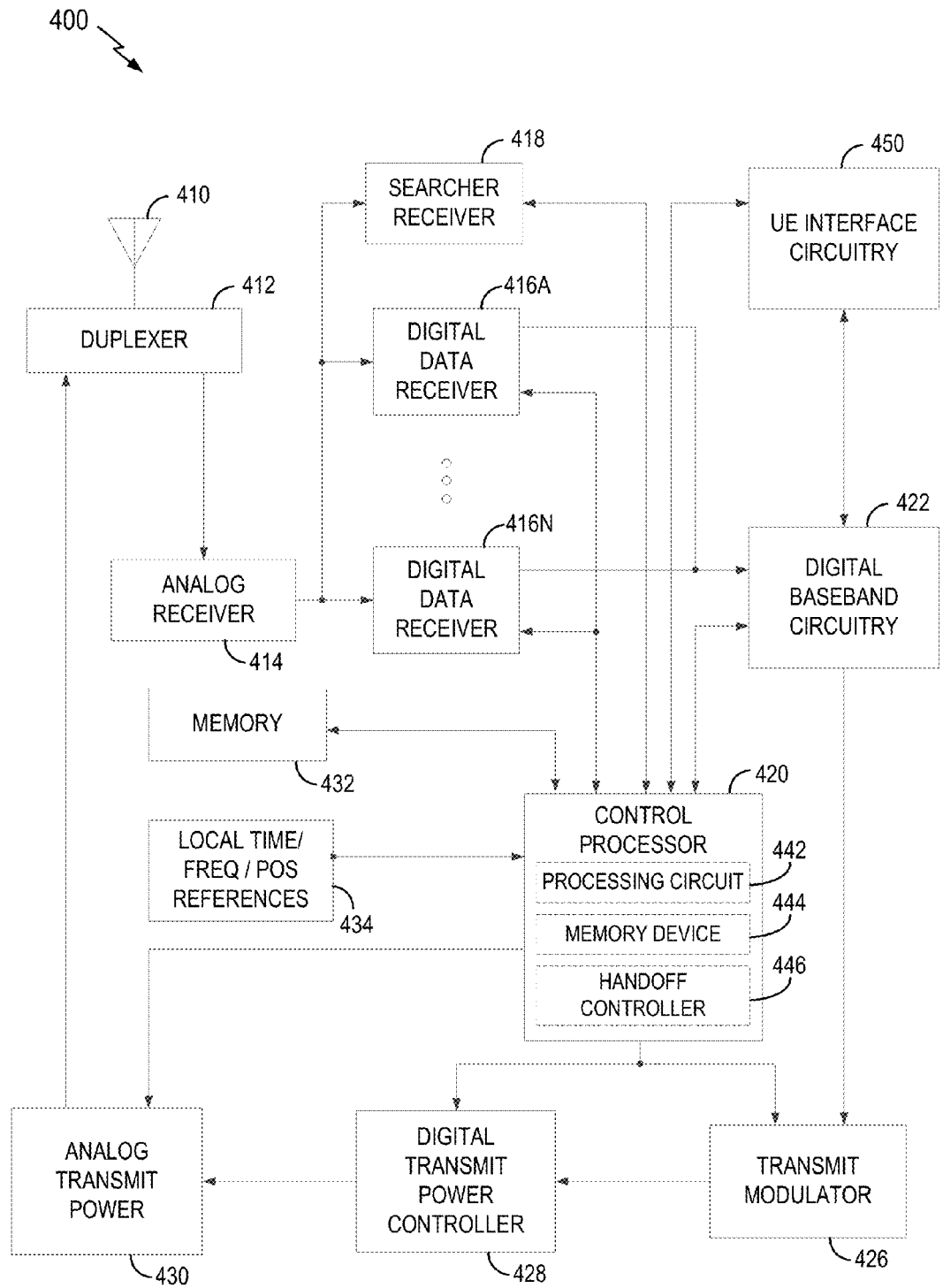
FIG. 4 is a block diagram of one example of a user terminal of FIG. 1 in accordance with some aspects of the disclosure.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are downconverted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a handoff controller 446 that independently or cooperatively perform handoff-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the handoff controller 446 is configured (e.g., programmed) to perform some or all of these operations. Although depicted in FIG. 4 as included within the control processor 420, for other implementations, one or more of the processing circuit 442, the memory device 444, or the handoff controller 446 may be a separate subsystem that is coupled to the control processor 420.

Figure 5:
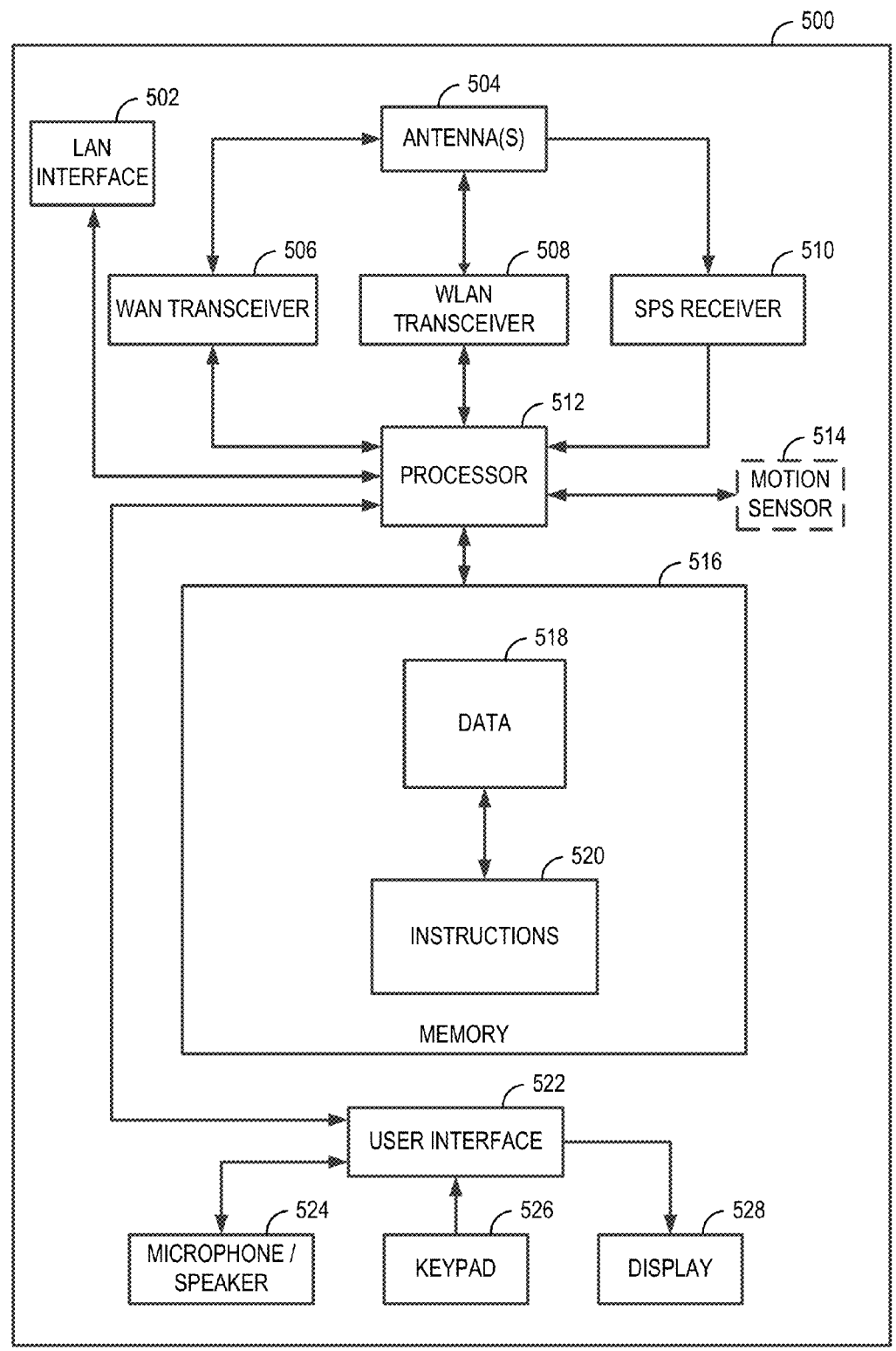
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the SNP's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an SNP. Thus, an SNP may have several NACs (e.g., implemented by the SNP controller 250 of FIG. 2), each of which controls a corresponding one of the satellites controlled by the SNP. In addition, a given satellite may support multiple beams. Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Figure 6:
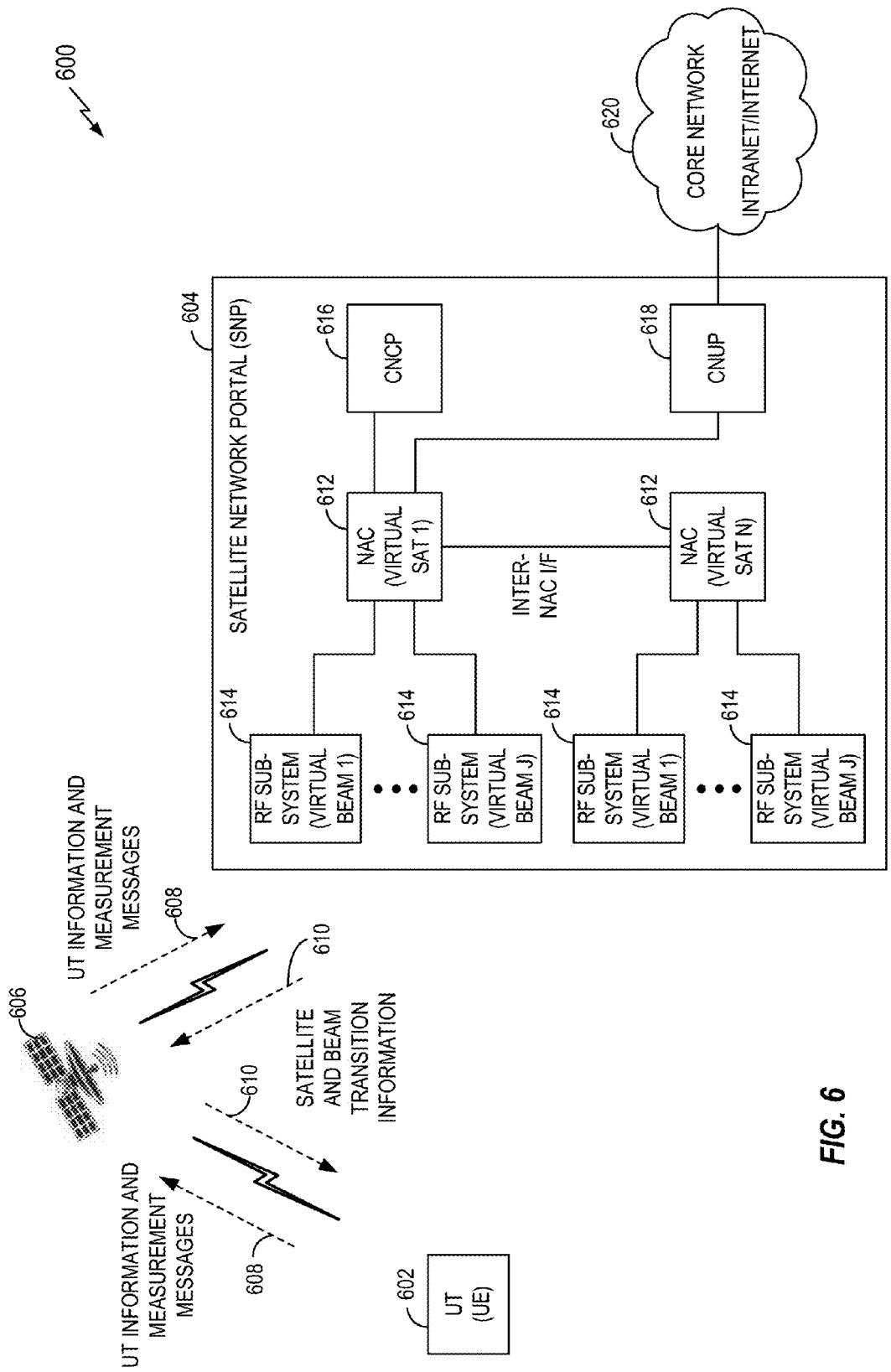
FIG. 6 is a block diagram of an example communication system in accordance with some aspects of the disclosure.

Referring to FIG. 6, various aspects of the disclosure relate to handoff of a user terminal (UT) 602 in communication with a satellite network portal (SNP) 604 through a satellite 606 in a non-geosynchronous satellite communication system 600, such as a low-earth orbit (LEO) satellite communication system for data, voice, video, or other communication. The UT 602 is an example of the UT 400 or the UT 401 of FIG. 1. The SNP 604 is an example of the SNP 200 or the SNP 201 of FIG. 1. The satellite 606 is an example of the satellite 300 of FIG. 1. In some aspects, the SNP 604 and the UT 602 use a satellite and beam transition table to determine when to handoff the UT 602 from one beam to another and/or from one satellite to another. For example, the UT 602 may send information 608 (e.g., capability information, location information, or other information) to the SNP 604. Based on this information, the SNP 604 generates satellite and beam transition information 610 and sends the information 610 to the UT 602 and/or the SNP 604 selects a handoff procedure for the UT 602. In some aspects, handoff of the UT 602 to a different satellite (a new serving satellite) involves the UT 602 conducting satellite signal measurements and sending information 608 in the form of a measurement message to the SNP 604. In some aspects, the SNP 604 generates a new satellite and beam transition table as a result of receiving the measurement message. In some aspects, the UT 602 receives satellite ephemeris information and uses the information to synchronize to a satellite. In some aspects, the UT 602 invokes a radio link failure mode if the UT 602 loses connectivity to a satellite and/or beam.

As shown in FIG. 6, the SNP 604 includes network access controllers (NACs) 612, each of which interfaces with one or more radio frequency (RF) subsystems 614 for communicating with the UT 602 via the satellite 606 (or some other satellite, not shown). The SNP 604 also includes a core network control plane (CNCP) 616, as well as a core network user plane (CNUP) 618 for communicating with one or more of a core network (e.g., 3G, 4G, 5G, etc.), an intranet, or an Internet 620. These and other aspects of the disclosure will be described in further detail below.

In some aspects, a handoff design may attempt to meet one or more of the following objectives: minimize signaling during handoffs; minimize data outage during handoffs; or reduce reliance on the UT's knowledge of the satellite ephemeris data, instead relying on the SNP's knowledge of the satellite location and the UT location.

Several example aspects of a UT, an SNP, and a satellite that may be used in conjunction with handoff of a UT in accordance with the teachings herein will now be described.

Satellite ID

A Satellite Identifier (ID) is a unique ID of a particular satellite within a satellite system. The Satellite ID allows the satellite to be uniquely identified within the satellite system (e.g., by a UT). To allow for a large satellite deployment, A Satellite ID could be 16 bits or more. In some implementations, the Satellite ID is transmitted on an overhead channel and is not required to be read immediately by the UT. The UT and the SNP may use a Satellite ID to index an ephemeris information table to locate the satellite and the projections of the satellite's beams on the earth at a given time.

Beam ID

A Beam ID is a unique ID for a beam. The Beam ID allows a beam from a given satellite to be uniquely identified (e.g., by a UT). In some aspects, a Beam ID may be detectable by a UT in a very short period of time (e.g., the Beam ID may be a continuous signature used on the pilot of the beam). Thus, a UT might not need to decode an overhead message to discover a Beam ID. In one non-limiting example, a Beam ID could include 10 bits: 2 bits for an SNP ID (e.g., 2 bits may be sufficient to have a unique SNP visible by a UT; and the 4 values for the SNP ID could be reused across the globe); and 8 bits for the beam commanded by an SNP (e.g., an SNP controls approximately 10 satellites×16 beams/satellite=160 beams/SNP=>8 bits to uniquely identify the beams). A different number of bits could be used in other implementations. Also, spatial diversity of the satellites could be taken into consideration to reduce the number of bits.

UT Capabilities

A UT may exchange its capabilities with the SNP at connection time or some other time. Several non-limiting example of UT capabilities follow.

A UT may be dual beam sense capable. Thus, one UT capability parameter (e.g., that takes a value of YES or NO) may indicate whether the UT is capable of sensing more than one beam. For example, this capability parameter may indicate, while the UT is actively communicating using a beam of a particular satellite, whether the UT can sense and detect a Beam ID of another beam of the same satellite. In some implementations, this capability parameter can be used to indicate whether a UT can support two beams at the same time. A different number of beams (e.g., three or more) could be supported in other implementations.

A UT may be dual satellite sense capable. Thus, another UT capability parameter (e.g., that takes a value of YES or NO) may indicate whether the UT is capable of sensing more than one satellite. For example, this capability parameter may indicate, while the UT is actively communicating using a beam of a particular satellite, whether the UT can sense and detect a Beam ID of another satellite. In some implementations, this capability parameter can be used to indicate whether a UT can support two satellites at the same time. A different number of satellites (e.g., three or more) could be supported in other implementations.

As discussed in more detail below, an SNP may use the sense capability of a UT to determine what type of handoff to use for the UT. For example, if a UT can only support a single beam at a time, handoff could simply be based on the satellite and beam transition table. Conversely, if a UT can support multiple beams/satellites at a time, an SNP could monitor for a measurement message from a UT during handoff, whereby the measurement message may affect how (e.g., when and/or where) the UT is handed-off.

Another UT capability parameter may indicate the inter-beam tune time (e.g., in microseconds (μsec)) for a UT. This capability parameter may indicate the time duration it takes for the UT to stop listening to a beam and start listening to another beam of the same satellite. Thus, in some aspects, the inter-beam tune time indicates how long it takes a UT to tune from one beam to another beam.

Another UT capability parameter may indicate the inter-satellite tune time (e.g., in microseconds (μsec)) for a UT. This capability parameter may indicate the time duration it takes for the UT to stop listening to a beam on the current satellite and start listening to a beam of another satellite. Thus, in some aspects, the inter-satellite tune time indicates how long it takes a UT to tune from one satellite to another satellite.

In some implementations, a tune time may be given as an upper bound. For example, a tune time may indicate the maximum amount of time that the UT is expected to take to tune from one beam or satellite to another.

In some implementations, a tune time may be described according to a formula. A non-limiting example of such a formula is: $a+b*\tau$ where, a is a constant that indicates the minimum time duration for the inter-satellite tuning, $\tau$ is the angular distance (in degrees) between the current satellite and the target satellite, and b is the movement speed of the UT's antenna in degrees of movement per millisecond.

Tuneaway Definitions

Signaling may be employed to allow a UT to tuneaway for inter-satellite and inter-beam sensing. This signaling can be used to define tuneaway periods for a UT to sense other beams of the same satellite or other satellites.

Radio Link Failure

During normal operation, when a UT is handed-off from one satellite or beam to another satellite or beam, the signaling for the handoff is completed between the SNP entity supporting the handoff and the UT. If the UT loses communication with the SNP before the handoff signaling is completed, a radio link failure (RLF) may be declared (e.g., at the UT). In this case, the UT may employ an RLF recovery mechanism to re-establish communication with the SNP.

UT Location

A UT location reporting mechanism is employed for handoff processing and paging so that the SNP will know the location of the UT (e.g., on a continual or regular basis). In some implementations, a UT will have reliable global positioning system (GPS) positioning.

For stationary UTs, the UT location reporting mechanism may involve the UT sending a signaling message to the SNP that reports the location (e.g., the GPS coordinates) of the UT.

For mobile UTs (e.g., UTs on a ship or an airplane), the UT location reporting mechanism may involve the UT sending a signaling message to the SNP that reports the speed and direction of the UT. This allows the SNP to continuously estimate the location of the UT. Even for mobile UTs, the direction and speed information may be relatively stable if the UTs are carried by (e.g., attached to) relatively large vessels.

Also, via location-related signaling, the UT may be informed of the location drift allowed before a new location update message is needed.

Some implementations may employ thresholds for location tolerance. Some implementations may employ GEO fencing. For example, if a UT is beyond a designated boundary relative to a satellite and/or an SNP (e.g., the UT is a certain distance away), the UT may be configured to send a location update to the SNP.

Ephemeris Transfer and Update Signaling

Ephemeris Transfer and Update signaling messages may be used to transfer satellite ephemeris data to the UTs. In some aspects, ephemeris data includes a geographic description of where a given satellite is at a given point in time. This data may be used by the UT when it searches for the next satellite and beam (e.g., after the UT detects a Radio Link Failure). For example, in some aspects, a UT may use the ephemeris data for a given satellite to determine where to point the UT's antenna (antennas) at a given point in time. In some aspects, an SNP may transmit a signaling message containing the satellite ephemeris data to all connected UTs (e.g., whenever there is an update). In some aspects, a UT may request satellite ephemeris data from the SNP (e.g., when the UT establishes a connection).

Satellite and Beam Transition Table

The SNP may generate a satellite and beam transition table that provides a list of satellites to which a UT may choose to handoff next. The table also may dictate exactly at what time the UT will switch over from one beam of the next satellite to another. A beam table may indicate, for a number of satellites, the beams to be used for each satellite. A beam table also may indicate, for each beam, the frequency (e.g., the nominal radio frequency or frequency band) of the beam and the Beam ID of the beam.

An SNP may define a satellite and beam transition table based on various information. In some aspects, an SNP may define the table using the location (and speed and direction, if specified) of the UT. In some aspects, an SNP may define the table using satellite locations over time calculated from ephemeris data. In some aspects, an SNP may define the table based on information regarding whether certain beams and/or satellites are turned off at certain times.

Table 1 below is a non-limiting example of a satellite and beam transition table. $TA_{beam}$ denotes the tune-away time from one beam to another of the same satellite. In this example, the UT is to tune to Satellite 1, Beam 1 (on frequency $F_{11}$) from time $a_1$ to time $b_1$. The UT is to then tune to Satellite 1, Beam 2 (on frequency $F_{21}$) from time $b_1+TA_{beam}$ to time $c_1$, and so on.

In some implementations, the table may be sent in a signaling message by the SNP to the UT it is serving, at any time before the UT is handed-off to the next satellite.

TABLE 1

| Satellite ID | Beam ID | Freq | Start Time (Frame number) | End Time (Frame number) |
|---|---|---|---|---|
| Satellite 1 | Beam 1 | $F_{11}$ | $a_1$ | $b_1$ |
|  | Beam 2 | $F_{21}$ | $b_1 + TA_{beam}$ | $c_1$ |
|  | ... | ... | ... | ... |
|  | Beam N | $F_{N1}$ | $m_1 + TA_{beam}$ | $n_1$ |
| Satellite 2 | Beam 1 | $F_{12}$ | $a_2$ | $b_2$ |
|  | Beam 2 | $F_{22}$ | $b_2 + TA_{beam}$ | $c_2$ |

TABLE 1-continued

| Satellite ID | Beam ID | Freq | Start Time (Frame number) | End Time (Frame number) |
|---|---|---|---|---|
|  | ... | ... | ... | ... |
|  | Beam N | $F_{N2}$ | $m_2 + TA_{beam}$ | $n_2$ |
|  | ... | ... | ... | ... |

In one example, the overhead of the satellite and beam transition table message is as follows (assuming that there are two satellites listed in the table): Satellite ID: 16 bits; Beam ID: 10 bits; Freq: Assuming 16 beam frequencies per satellite, this field is 4 bits; and Start and End Times: 15 bits.

For the Start Time and End Time, these times can be specified in terms of Frame Numbers. The physical layer may specify the use of 10 millisecond (ms) transmission frames for the system. Assuming that a satellite handoff takes place every 3 minutes, the number of frames that can be transmitted between handoffs is 18,000. Frame Numbers can be re-initialized from zero after every handoff. The number of bits that are then required to specify the Frame Numbers is thus 15 bits in this example.

In the above example, the total overhead of the message would be 1020 bits=128 bytes (approximately). The values of $a_1, b_1, \ldots, n_1, TA_{beam}$ would be specified.

If a maximum of 1000 active users can be served at any time by one beam, and if a beam overall downlink (DL) throughput is approximately 300 Mbps, the overhead is given by: overhead=(128 bytes×numUsersBeam)/(total bytes delivered by beam over 3 minutes), =(128 bytes×1000)/(300×$10^6$×3×60)=19×$10^{-6}$ (approximately).

Inter-Satellite Handoff

Figure 7:
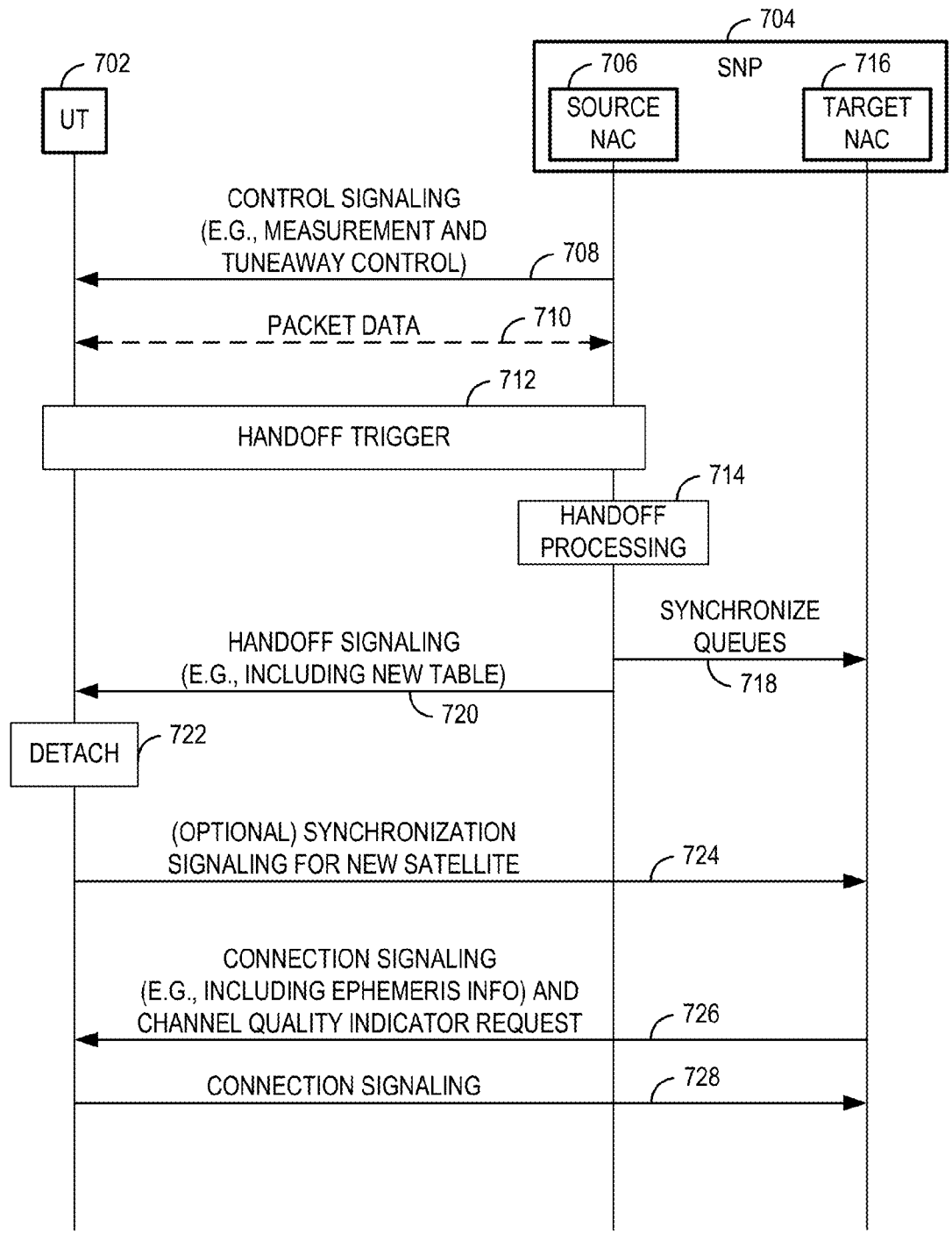
FIG. 7 is a diagram illustrating an example of inter-satellite handoff signaling in accordance with some aspects of the disclosure.
Figure 8:
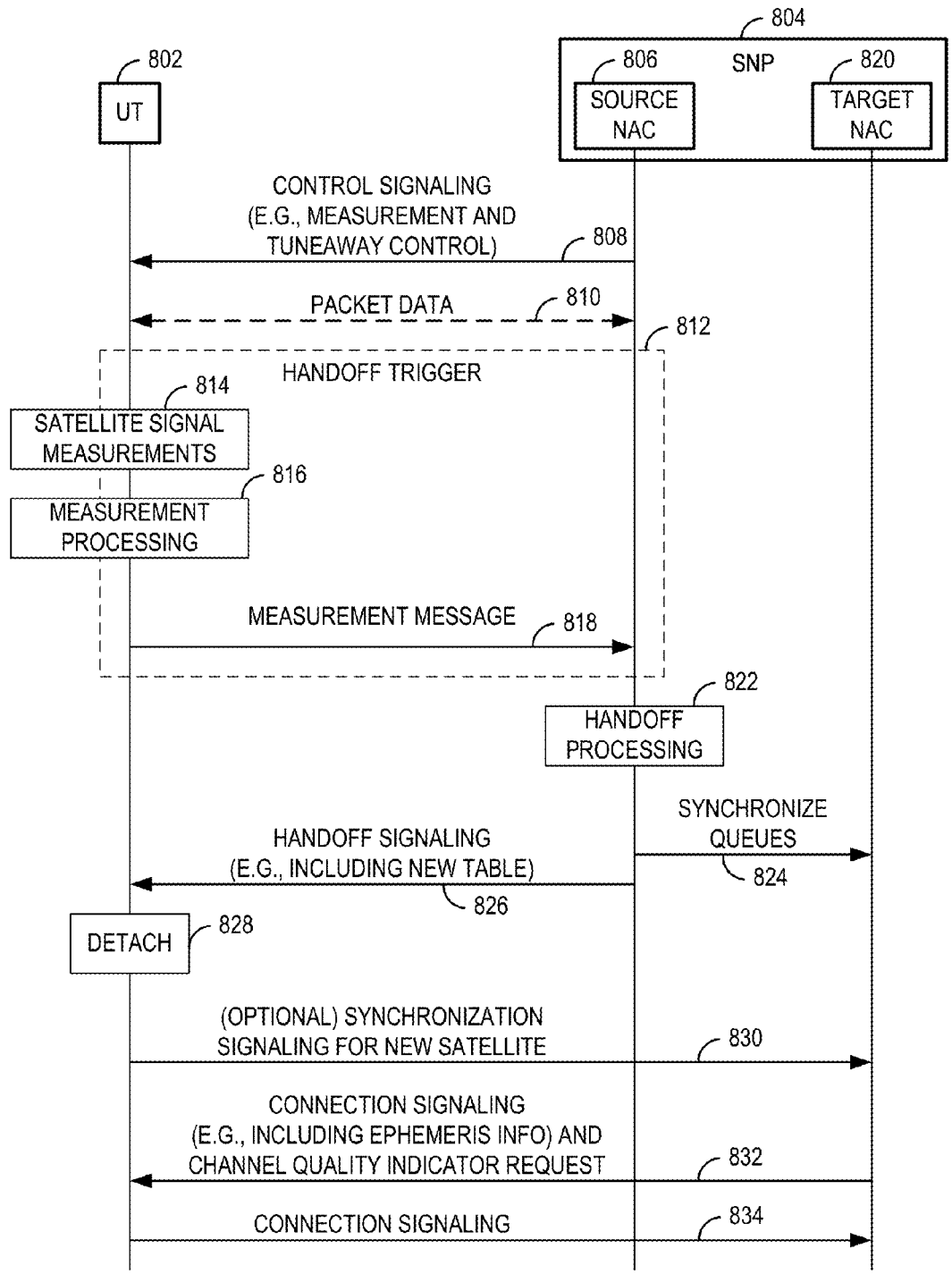
FIG. 8 is a diagram illustrating another example of inter-satellite handoff signaling in accordance with some aspects of the disclosure.

FIGS. 7 and 8 illustrate examples of inter-satellite handoff. In these examples, the SNP includes a source NAC that controls a first satellite and a target NAC that controls a second satellite. In each case, the UT initially is connected to a source satellite (and, hence, the source NAC) and is subsequently handed-off to a target satellite (and, hence, the target NAC). A different number of NACs and satellites could be supported in other implementations. Also, in some implementations, a common (i.e., the same) entity could support multiple satellites.

FIG. 7 is an example where a UT 702 does not send a measurement message. For example, the UT 702 might not support the sensing of multiple beams/satellites or the UT 702 may determine that a measurement message need not be sent to an SNP 704. In this case, the UT 702 and the SNP 704 rely on the existing satellite and beam transition table to determine when to transition to the next beam/satellite and where to transition (e.g., which beam, which frequency, which satellite). The UT 702 is an example of the UT 400 or the UT 401 of FIG. 1. The SNP 704 is an example of the SNP 200 or the SNP 201 of FIG. 1.

A source NAC 706 sends control signaling 708 to the UT 702. This control signaling 708 may include, for example, measurement information and tuneaway control information (e.g., tuneaway definitions). In addition, packet data 710 is exchanged between the UT 702 and the source NAC 706. The source NAC 706 is an example of the NAC 612 of FIG. 6.

At some point in time a handoff is triggered 712. For example, the current time may correspond to the time for a transition from one satellite to the next indicated by the satellite and beam transition table.

Other handoff triggers may be employed as well. For example, the SNP 704 (e.g., the source NAC 706) may decide autonomously that the UT 702 needs to be handed-off. Such a trigger may be due to, for example: the current serving satellite is moving out of range of the UT 702; the satellite is moving out of the range of the SNP 704, even if it may be within the range of the UT 702; or the beam serving the UT 702 will be blacked-out due to GEO requirements.

In the event the UT 702 is capable of sensing another beam/satellite while connected to the first satellite, the UT 702 may search the signal strength of the default satellite and beam for handoff. It may be assumed that the UT 702 has the location information of this satellite in order to do so. This location information can be obtained from the satellite ephemeris data the UT 702 possesses. If the signal strength is satisfactory, the UT 702 does nothing and waits for the source NAC 706 to start the inter-satellite handoff process.

Thus, in the example of FIG. 7, both the UT 702 and the source NAC 706 will follow the table and commence the handoff to a new serving satellite. To this end, the source NAC 706 will perform handoff processing 714. For example, the source NAC 706 may communicate with a target NAC 716 to commence the handoff. In some aspects, this may involve synchronizing the queues 718 (e.g., packet traffic queues) between the NACs 706 and 716. Also, as the time of the handoff is known ahead of time, the user queues can be transferred ahead of time. The target NAC 716 is an example of the NAC 612 of FIG. 6.

The source NAC 706 then sends handoff signaling 720 to the UT 702. In some aspects, this handoff signaling 720 may include information that enables the UT 702 to communicate with the target NAC 716. In some aspects, this handoff signaling 720 may include a new satellite and beam transition table (e.g., that the source NAC 706 received from the target NAC 716).

The UT 702 then detaches 722 from the first satellite and synchronizes to the second satellite. To this end, the UT 702 may send synchronization signaling 724 for the second satellite to the target NAC 716. In some aspects, this may involve the UT 702 performing a random access procedure at the second satellite.

The UT 702 and the target NAC 716 may then exchange connection signaling 726 and 728. In some aspects, this may involve the target NAC 716 sending ephemeris information to the UT 702 and requesting a channel quality indicator from the UT 702. In some aspects, the UT 702 may use the ephemeris information to synchronize with the second satellite.

Also, the various entities may perform various background operations to ensure that packet forwarding is done properly and any needed clean-up (e.g., cache clean-up) is performed.

FIG. 8 is an example where a UT 802 does send a measurement message. For example, the UT 802 might determine that a measurement message needs to be sent to an SNP 804 because the measured channel conditions (e.g., signal strength) from the serving satellite or the target satellite are unacceptable (e.g., the signal strength is too low). In this case, the SNP 804 may generate a new satellite and beam transition table based on the measurement message. The UT 802 and the SNP 804 will then use the new satellite and beam transition table to determine when to transition to the next beam/satellite and where to transition (e.g., which beam, which frequency, which satellite). The UT 802 is an example of the UT 400 or the UT 401 of FIG. 1. The SNP 804 is an example of the SNP 200 or the SNP 201 of FIG. 1.

As in FIG. 7, a source NAC 806 sends control signaling 808 to the UT 802. This control signaling 808 may include, for example, measurement information and tuneaway control information (e.g., tuneaway definitions). In addition, packet data 810 is exchanged between the UT 802 and the source NAC 806. The source NAC 806 is an example of the NAC 612 of FIG. 6.

At some point in time a handoff is triggered 812. In some cases, the current time corresponding to the time for a transition from one satellite to the next as indicated by the satellite and beam transition table constitutes a handoff trigger. In some cases, a measurement message sent by the UT 802 indicating that a neighbor satellite is materially stronger (e.g., associated with a stronger received signal strength) than a current serving satellite may constitute a handoff trigger.

Other handoff triggers may be employed as well. For example, the SNP 804 (e.g., the source NAC 806) may decide autonomously that the UT 802 needs to be handed-off. Such a trigger may be due to, for example: the current serving satellite is moving out of range of the UT 802; the satellite is moving out of the range of the SNP 804, even if it may be within the range of the UT 802; or the beam serving the UT 802 will be blacked-out due to GEO requirements.

In the example of FIG. 8, the UT 802 is capable of sensing another beam/satellite while connected to the first satellite. Thus, the UT 802 may perform channel quality measurements (e.g., satellite signal strength measurements). For example, the UT 802 may measure 814 the signal strength from the current serving satellite (first satellite) and the target satellite (second satellite).

The UT 802 then performs measurement processing 816 to determine, for example, whether either channel quality is inadequate (e.g., signal strength is too low). In the event either channel quality is inadequate, the UT 802 may elect to send a measurement message 818 to the source NAC 806. This measurement message 818 may include, for example, the results of the measurements (e.g., signal strength in dB), an indication that the handoff time needs to be advanced (e.g., because the signal from the source satellite is currently too low), an indication that the handoff time needs to be delayed (e.g., because the signal from the target satellite is currently too low), or some other indication.

Thus, similar to FIG. 7, the UT 802 may search the signal strength of the default satellite and beam for handoff. Again, it may be assumed that the UT 802 has the location information of this satellite in order to do so (e.g., obtained from the satellite ephemeris data the UT 802 possesses). If the signal strength is not satisfactory, the UT 802 may send a measurement message 818 to the source NAC 806 indicating a satellite different from the default one, to trigger the handoff process early or delay it.

The source NAC 806 may thus make a decision to handoff the UT 802 to a target satellite and a target NAC 820 based on the satellite and beam transition table and on any measurement message 818 the source NAC 806 receives from the UT 802. Thus, as indicated in FIG. 8, the source NAC 806 will perform some handoff processing 822. For example, the source NAC 806 may decide, based on the measurement message 818, whether the handoff time needs to be advanced (early handoff) or delayed (late handoff), or whether some other satellite should be selected as the target. In addition, the source NAC 806 may communicate with a target NAC 820 to commence the handoff. In some aspects, this may involve synchronizing the queues 824 (e.g., packet traffic queues) between the NACs 806 and 820. The target NAC 820 is an example of the NAC 612 of FIG. 6.

The source NAC 806 then sends handoff signaling 826 to the UT 802. In some aspects, this handoff signaling 826 may include information that enables the UT 802 to communicate with the target NAC 820. In some aspects, this handoff signaling 826 may include a new satellite and beam transition table (e.g., that the source NAC 806 received from the target NAC 820).

The UT 802 then detaches 828 from the first satellite and synchronizes to the second satellite. To this end, the UT 802 may send synchronization signaling 830 for the second satellite to the target NAC 820.

The UT 802 and the target NAC 820 may then exchange connection signaling 832 and 834. In some aspects, this may involve the target NAC 820 sending ephemeris information to the UT 802 and requesting a channel quality indicator from the UT 802. Again, the various entities may perform various background operations to ensure that packet forwarding is done properly and any needed clean-up (e.g., cache clean-up) is performed.

With normal inter-satellite handoff, hybrid automatic repeat request (HARQ) processes may be terminated. However, the source NAC may know exactly when the handoff will happen, therefore the source NAC can ensure that the forward link data buffers are drained. Also, the gap for data flow can be minimized since the time of handoff is known.

Inter-Beam Handoff

Inter-beam handoff is executed by the SNP and the UT synchronously according to the timeline specified in the satellite and beam transition table. Using the tuneaway periods or dual receive capability, the UT detects the presence of the next beam specified in the satellite and beam transition table. If the UT detects the next beam successfully, a normal inter-beam handoff is executed without any signaling between the UT and the SNP.

With normal inter-beam handoff, forward link HARQ processes may be carried over from one beam to the next. In addition, reverse assignments may be cancelled as the UT hands-off from one beam to the next. For example, the UT may instead send new request messages to send reverse link data.

Exception Scenarios

If the UT loses the current serving beam before the expiration of the specified time in the satellite and beam transition table, the UT enters into RLF mode. In RLF mode, the UT may attempt to find an alternate beam or satellite (e.g., based on the ephemeris information at the UT). For example, the UT may attempt to connect to the next satellite that should be serving the UT. If the UT successfully establishes another connection, the UT can send signaling messages to the SNP to continue communication where the UT left off before the RLF.

While being served by a beam, the UT may fail to detect the next beam specified in the satellite and beam transition table, but may detect another beam. This may happen, for example, to a fast moving UT (e.g., a UT attached to an airplane). In this case, the UT may send a measurement message to initiate another handoff procedure. In addition, the UT may also send a position update if it has moved since the last time a position update was sent. In response, the SNP may send an updated satellite and beam transition table. In this case, the UT follows the updated table. Alternatively, the SNP may start a completely new handoff process.

Example Operations

With the above in mind, additional examples of operations that may be performed by a UT and/or an SNP in support of handoff of the UT will now be described with respect to FIGS. 9-19.

Figure 9:
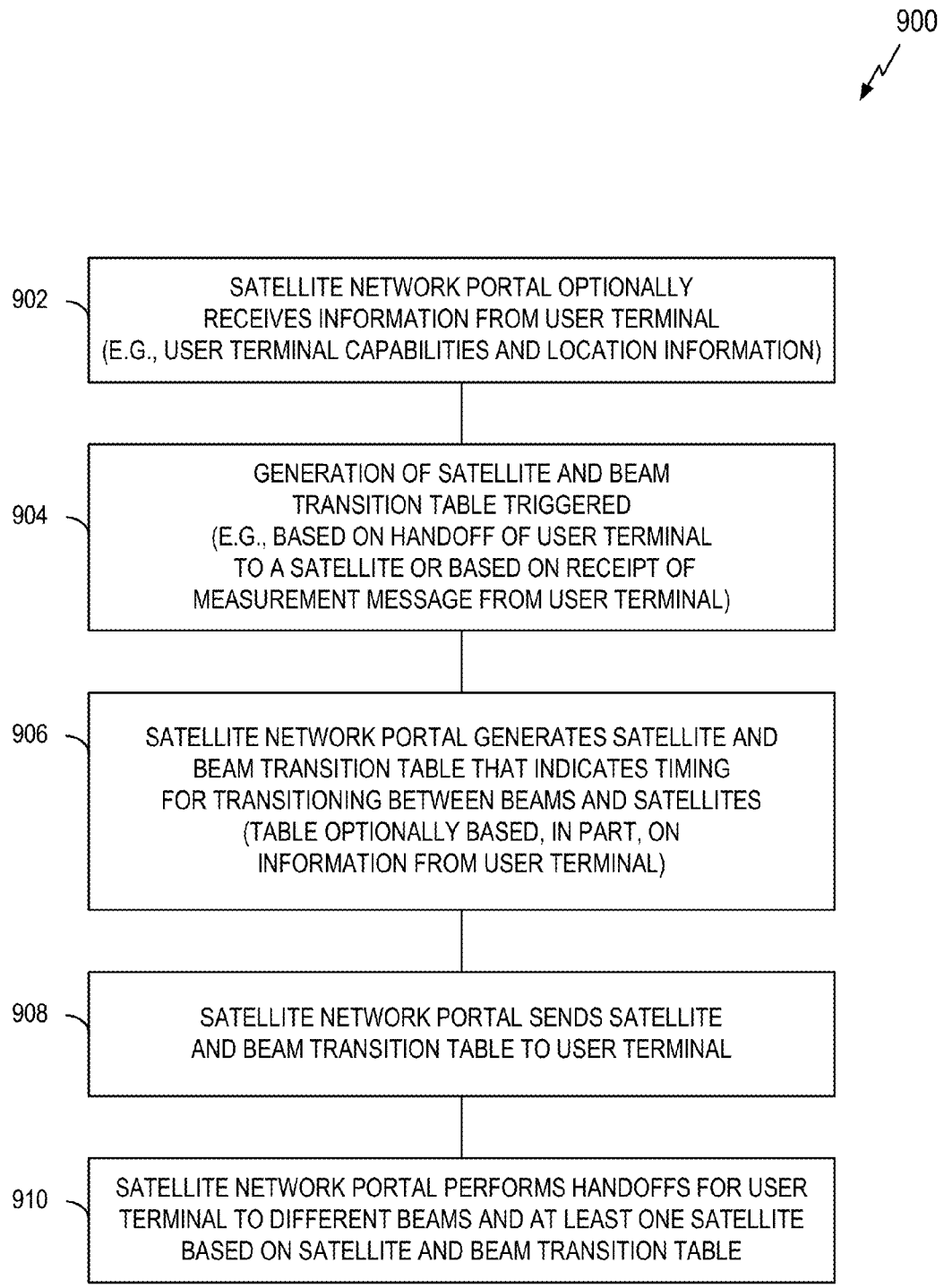
FIG. 9 is a diagram illustrating an example of generating and using a satellite and beam transition table in accordance with some aspects of the disclosure.

FIG. 9 is a diagram illustrating an example of a process 900 for generating and using a satellite and beam transition table in accordance with some aspects of the disclosure. The process 900 may take place within a processing circuit which may be located in an SNP or some other suitable apparatus (device). In some implementations, the process 900 represents operations performed by the SNP controller 250 of FIG. 2. In some implementations, the process 900 represents operations performed by the apparatus 2000 of FIG. 20 (e.g., by the processing circuit 2010). Of course, in various aspects within the scope of the disclosure, the process 900 may be implemented by any suitable apparatus capable of supporting communication-related operations.

At block 902, an SNP (or other suitable apparatus) optionally receives information from a user terminal. For example, the SNP may receive user terminal capabilities and location information.

At block 904, the generation of a satellite and beam transition table is triggered at the SNP (or other suitable apparatus). For example, the generation of the table may be triggered based on handoff of a user terminal to a satellite or based on receipt of a measurement message from the user terminal.

At block 906, the SNP (or other suitable apparatus) generates a satellite and beam transition table that indicates timing for transitioning between beams and satellites. In some aspects, the table is optionally based, in part, on information received from the user terminal at block 902.

At block 908, the SNP (or other suitable apparatus) sends the satellite and beam transition table to the user terminal.

At block 910, the SNP (or other suitable apparatus) performs handoffs for the user terminal to different beams and at least one satellite based on the satellite and beam transition table.

Figure 10:
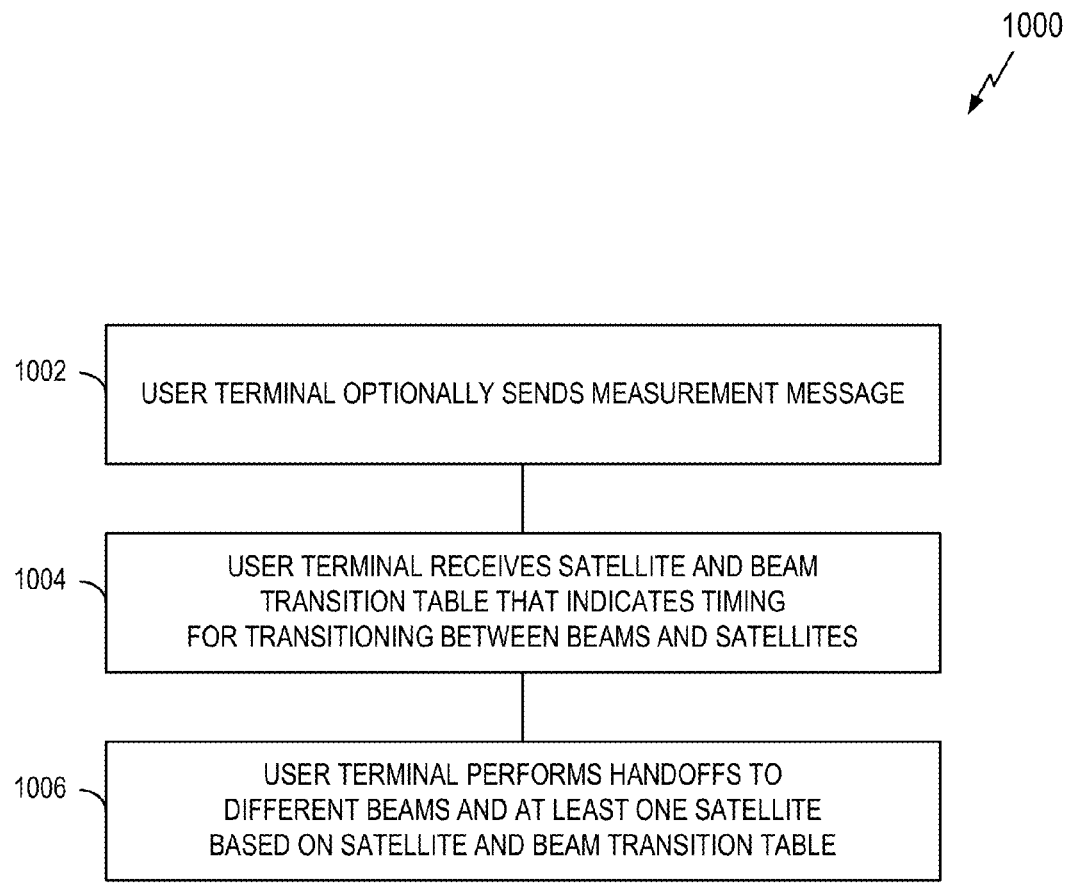
FIG. 10 is a diagram illustrating an example of using a satellite and beam transition table in accordance with some aspects of the disclosure.

FIG. 10 is a diagram illustrating an example of a process 1000 for using a satellite and beam transition table in accordance with some aspects of the disclosure. The process 1000 may take place within a processing circuit which may be located in a user terminal or some other suitable apparatus (device). In some implementations, the process 1000 represents operations performed by the control processor 420 of FIG. 4. In some implementations, the process 1000 represents operations performed by the apparatus 2200 of FIG. 22 (e.g., by the processing circuit 2210). Of course, in various aspects within the scope of the disclosure, the process 1000 may be implemented by any suitable apparatus capable of supporting communication-related operations.

At block 1002, a user terminal (or other suitable apparatus) optionally sends a measurement message.

At block 1004, the user terminal (or other suitable apparatus) receives a satellite and beam transition table that indicates timing for transitioning between beams and satellites.

At block 1006, the user terminal (or other suitable apparatus) performs handoffs to different beams and at least one satellite based on the satellite and beam transition table.

Figure 11:
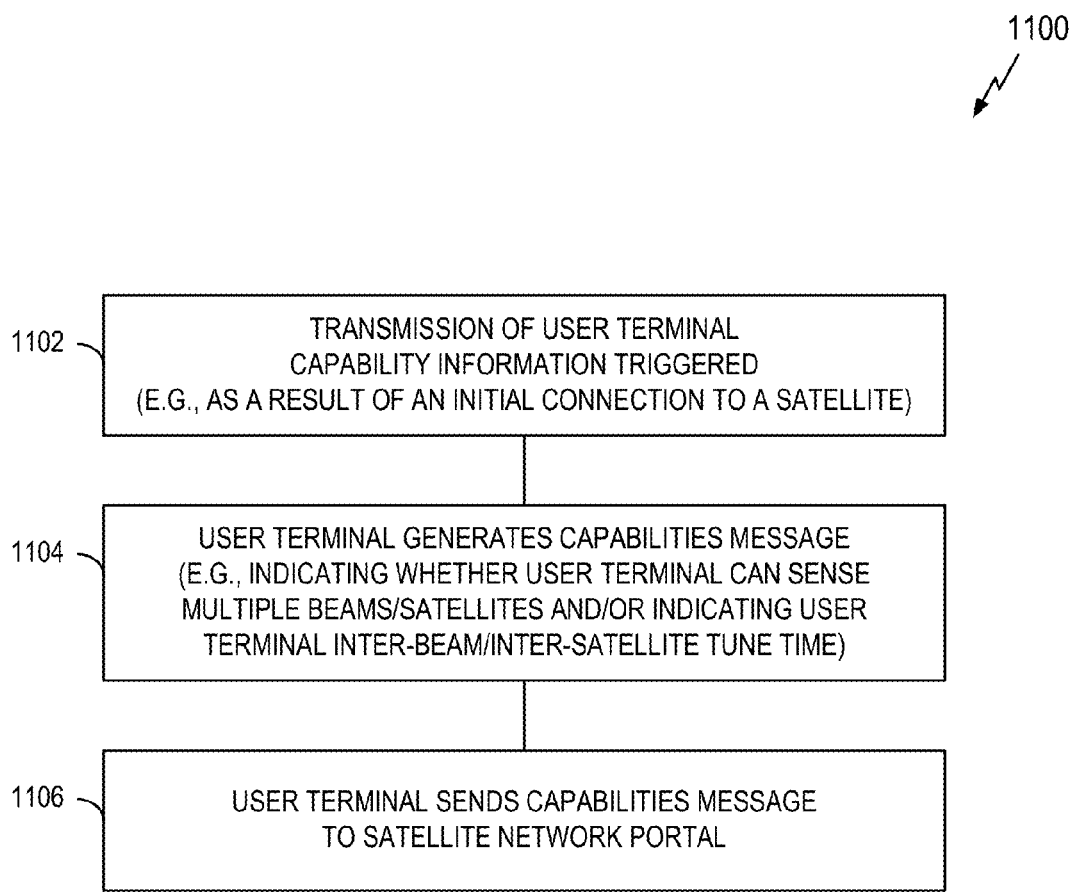
FIG. 11 is a diagram illustrating an example of signaling user terminal capabilities in accordance with some aspects of the disclosure.

FIG. 11 is a diagram illustrating an example of a process 1100 for signaling user terminal capability information in accordance with some aspects of the disclosure. The process 1100 may take place within a processing circuit which may be located in a user terminal or some other suitable apparatus (device). In some implementations, the process 1100 represents operations performed by the control processor 420 of FIG. 4. In some implementations, the process 1100 represents operations performed by the apparatus 2200 of FIG. 22 (e.g., by the processing circuit 2210). Of course, in various aspects within the scope of the disclosure, the process 1100 may be implemented by any suitable apparatus capable of supporting communication-related operations.

At block 1102, the transmission of user terminal capability information is triggered at a user terminal (or other suitable apparatus). For example, the transmission may be triggered as a result of an initial connection to a satellite.

At block 1104, the user terminal (or other suitable apparatus) generates a capabilities message. In some aspects, the message indicates whether the UT can sense multiple beams/satellites and/or the message indicates UT inter-beam/inter-satellite tune time.

At block 1106, the user terminal (or other suitable apparatus) sends the capabilities message to an SNP.

Figure 12:
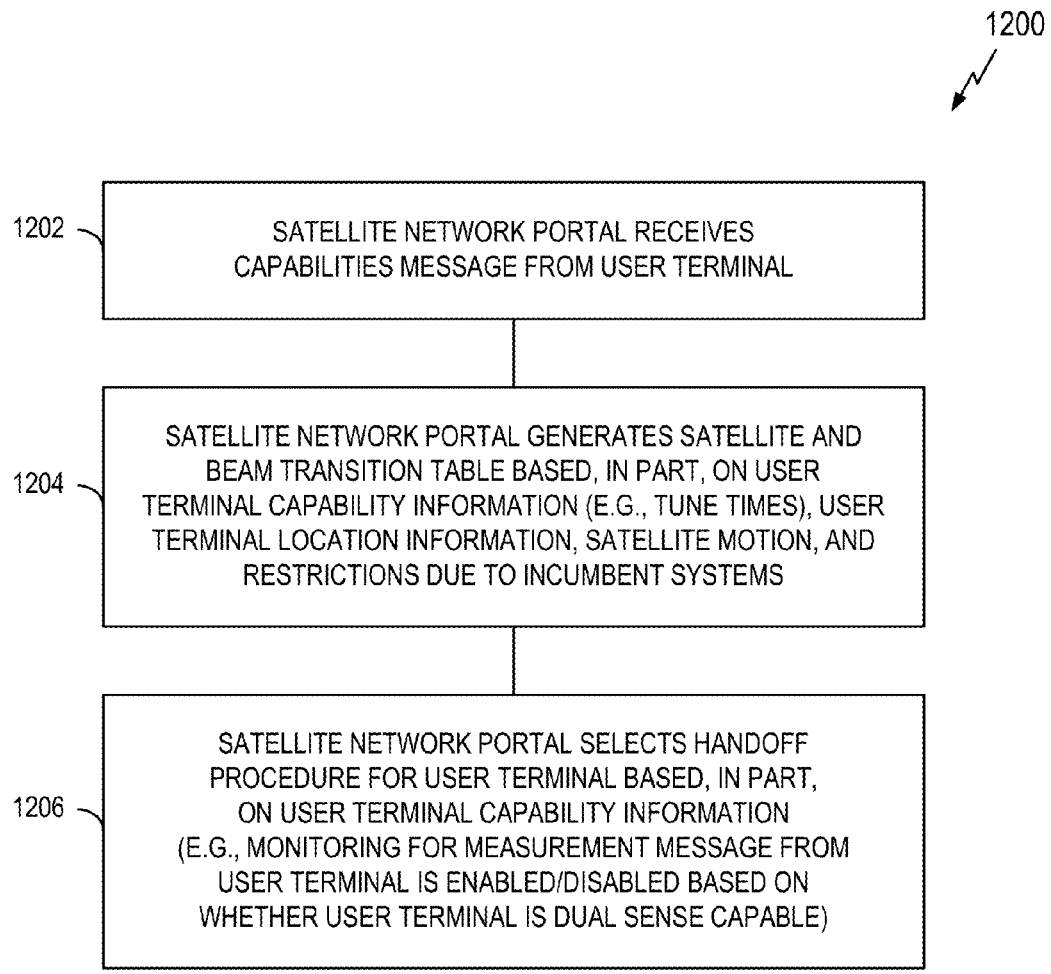
FIG. 12 is a diagram illustrating an example of using user terminal capabilities in accordance with some aspects of the disclosure.

FIG. 12 is a diagram illustrating an example of a process 1200 for using user terminal capabilities in accordance with some aspects of the disclosure. The process 1200 may take place within a processing circuit which may be located in an SNP or some other suitable apparatus (device). In some implementations, the process 1200 represents operations performed by the SNP controller 250 of FIG. 2. In some implementations, the process 1200 represents operations performed by the apparatus 2000 of FIG. 20 (e.g., by the processing circuit 2010). Of course, in various aspects within the scope of the disclosure, the process 1200 may be implemented by any suitable apparatus capable of supporting communication-related operations.

At block 1202, an SNP (or other suitable apparatus) receives a capabilities message from a user terminal. This capabilities message includes user terminal capability information.

At block 1204, the SNP (or other suitable apparatus) generates a satellite and beam transition table. In some aspects, the table is generated based, in part, on the user terminal capability information (e.g., tune times), user terminal location information, satellite motion, ephemeris information, and a restriction due to incumbent systems.

At block 1206, the SNP (or other suitable apparatus) selects a handoff procedure for the user terminal based, in part, on the user terminal capability information. For example, monitoring for a measurement message from a user terminal may be enabled or disabled based on whether the user terminal is dual sense capable. Thus, an apparatus may enable or disable whether the apparatus monitors for a measurement message based on the user terminal capability information.

Figure 13:
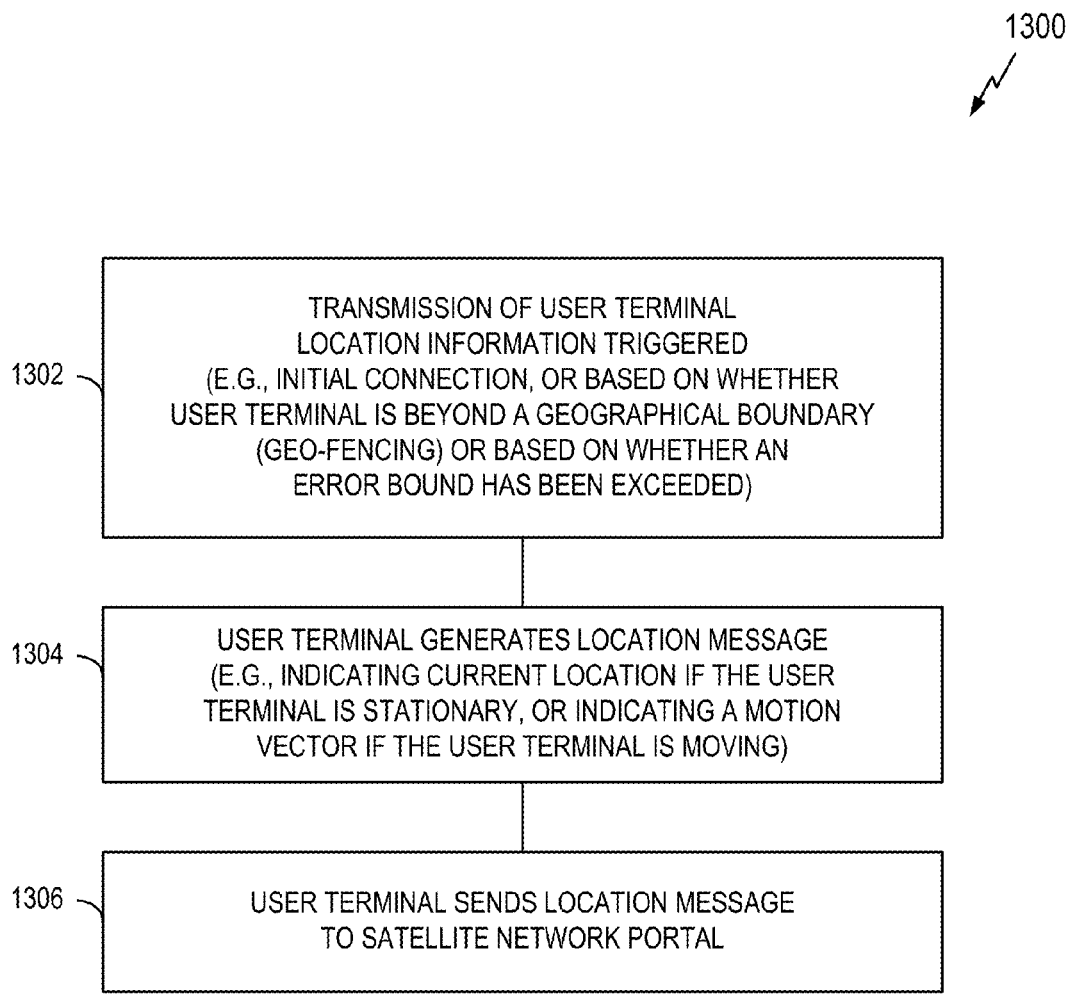
FIG. 13 is a diagram illustrating an example of signaling user terminal location information in accordance with some aspects of the disclosure.

FIG. 13 is a diagram illustrating an example of a process 1300 for signaling user terminal location information in accordance with some aspects of the disclosure. The process 1300 may take place within a processing circuit which may be located in a user terminal or some other suitable apparatus (device). In some implementations, the process 1300 represents operations performed by the control processor 420 of FIG. 4. In some implementations, the process 1300 represents operations performed by the apparatus 2200 of FIG. 22 (e.g., by the processing circuit 2210). Of course, in various aspects within the scope of the disclosure, the process 1300 may be implemented by any suitable apparatus capable of supporting communication-related operations.

At block 1302, the transmission of user terminal location information is triggered at a user terminal (or other suitable apparatus). This may be the result of an initial connection, or based on whether the UT is beyond a geographical boundary (geo-fencing), or based on whether an error bound has been exceeded.

At block 1304, the user terminal (or other suitable apparatus) generates a location message. In some aspects, the message may indicate the current location if the UT is stationary, or indicate a motion vector if the UT is moving.

At block 1306, the user terminal (or other suitable apparatus) sends the location message to an SNP.

Figure 14:
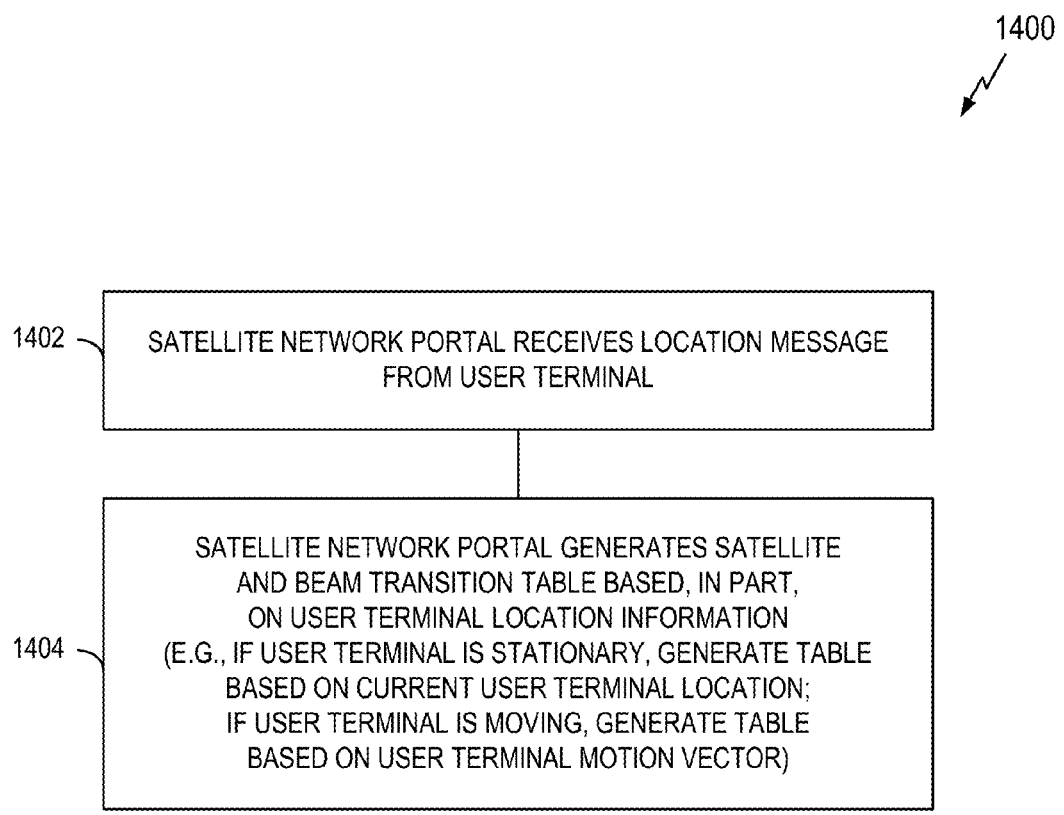
FIG. 14 is a diagram illustrating an example of using user terminal location information in accordance with some aspects of the disclosure.

FIG. 14 is a diagram illustrating an example of a process 1400 for using user terminal location information in accordance with some aspects of the disclosure. The process 1400 may take place within a processing circuit which may be located in an SNP or some other suitable apparatus (device). In some implementations, the process 1400 represents operations performed by the SNP controller 250 of FIG. 2. In some implementations, the process 1400 represents operations performed by the apparatus 2000 of FIG. 20 (e.g., by the processing circuit 2010). Of course, in various aspects within the scope of the disclosure, the process 1400 may be implemented by any suitable apparatus capable of supporting communication-related operations.

At block 1402, an SNP (or other suitable apparatus) receives a location message from a user terminal. This location message includes user terminal location information.

At block 1404, the SNP (or other suitable apparatus) generates a satellite and beam transition table based, in part, on user terminal location information. For example, if the UT is stationary, the SNP may generate the table based on the current UT location. As another example, if the UT is moving, the SNP may generate the table based on a UT motion vector.

Figure 15:
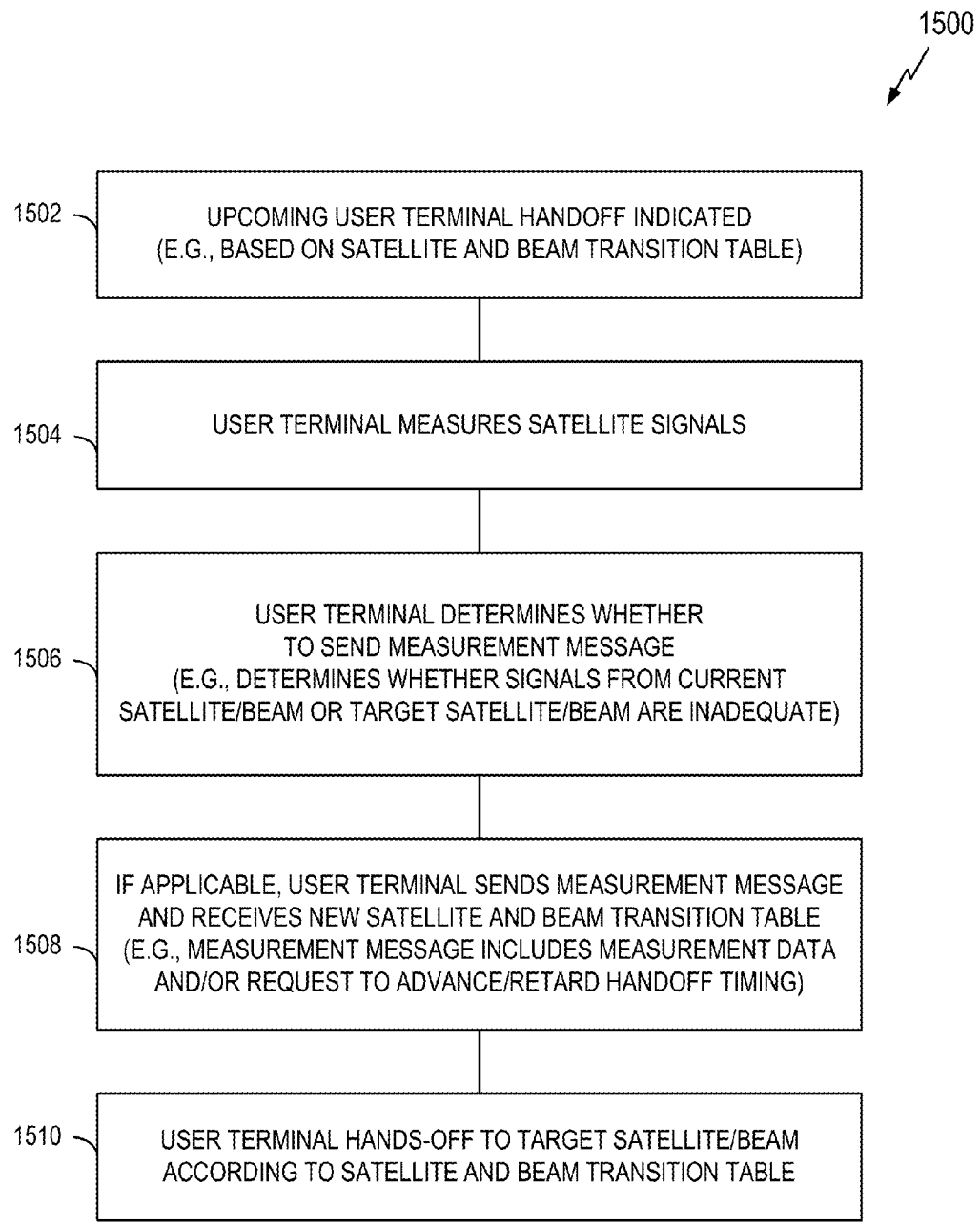
FIG. 15 is a diagram illustrating an example of user terminal handoff operations in accordance with some aspects of the disclosure.

FIG. 15 is a diagram illustrating an example of a user terminal handoff process 1500 in accordance with some aspects of the disclosure. The process 1500 may take place within a processing circuit which may be located in a user terminal or some other suitable apparatus (device). In some implementations, the process 1500 represents operations performed by the control processor 420 of FIG. 4. In some implementations, the process 1500 represents operations performed by the apparatus 2200 of FIG. 22 (e.g., by the processing circuit 2210). Of course, in various aspects within the scope of the disclosure, the process 1500 may be implemented by any suitable apparatus capable of supporting communication-related operations.

At block 1502, an upcoming user terminal handoff is indicated at a user terminal (or other suitable apparatus). For example, the handoff may be indicated based on a satellite and beam transition table.

At block 1504, the user terminal (or other suitable apparatus) measures satellite signals (e.g., signals from the satellites indicated in the table).

At block 1506, the user terminal (or other suitable apparatus) determines whether to send a measurement message. In some aspects, this determination may involve determining whether signals from the current satellite/beam or the target satellite/beam are inadequate.

At block 1508, if applicable, the user terminal (or other suitable apparatus) sends a measurement message and receives a new satellite and beam transition table. In some aspects, the message may include measurement data and/or a request to advance/retard handoff timing. Thus, in some aspects, the user terminal may send a measurement message based on the signals measured at block 1504 and receive the table as a result of sending the measurement message.

At block 1510, the user terminal (or other suitable apparatus) hands-off to the target satellite/beam according to the satellite and beam transition table.

Figure 16:
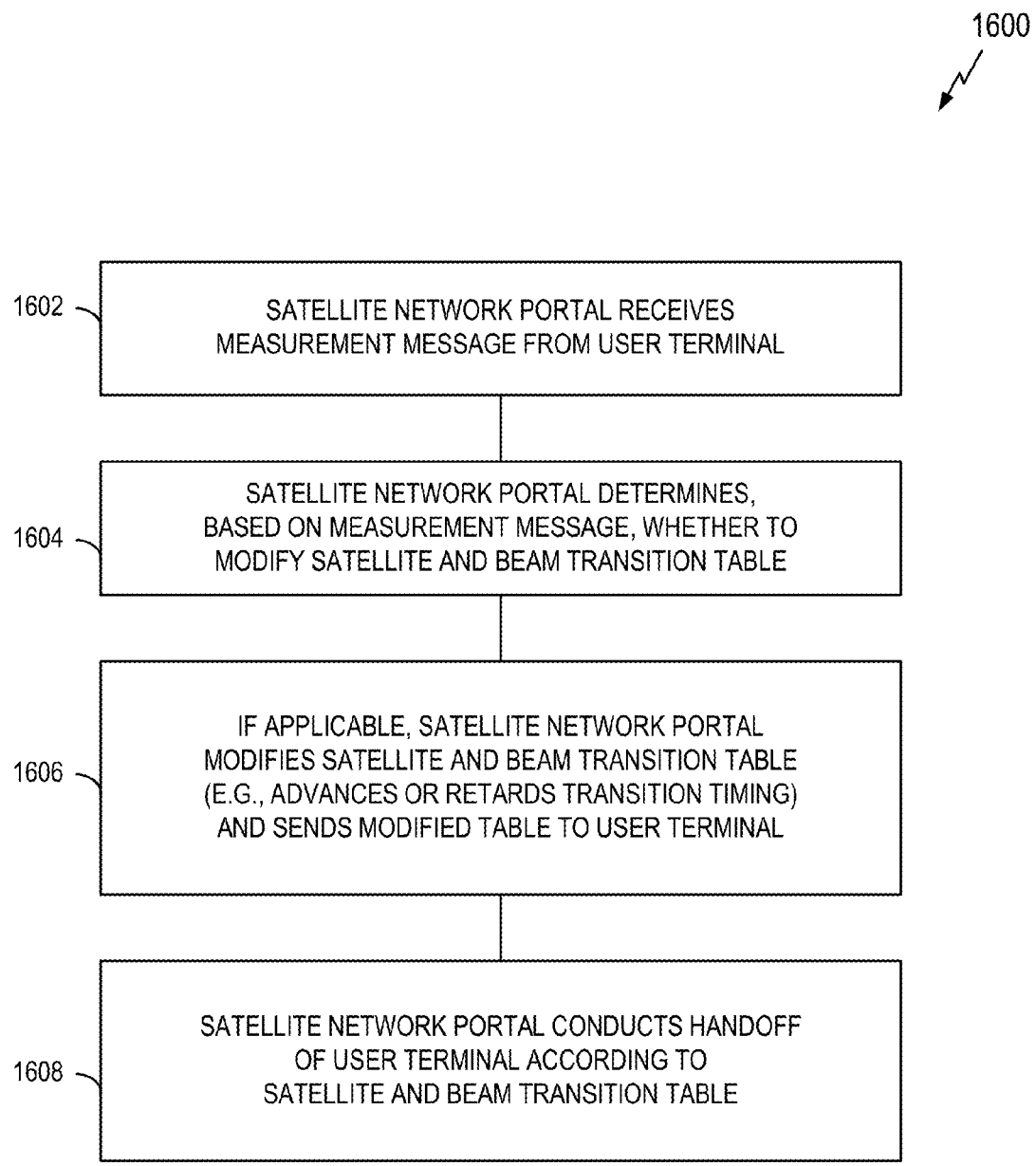
FIG. 16 is a diagram illustrating an example of SNP handoff operations in accordance with some aspects of the disclosure.

FIG. 16 is a diagram illustrating an example of an SNP handoff process 1600 in accordance with some aspects of the disclosure. The process 1600 may take place within a processing circuit which may be located in an SNP or some other suitable apparatus (device). In some implementations, the process 1600 represents operations performed by the SNP controller 250 of FIG. 2. In some implementations, the process 1600 represents operations performed by the apparatus 2000 of FIG. 20 (e.g., by the processing circuit 2010). Of course, in various aspects within the scope of the disclosure, the process 1600 may be implemented by any suitable apparatus capable of supporting communication-related operations.

At block 1602, an SNP (or other suitable apparatus) receives a measurement message from a user terminal.

At block 1604, the SNP (or other suitable apparatus) determines, based on the measurement message, whether to modify the satellite and beam transition table.

At block 1606, if applicable, the SNP (or other suitable apparatus) modifies the satellite and beam transition table (e.g., advances or retards transition timing) and sends the modified table to the user terminal.

At block 1608, the SNP (or other suitable apparatus) conducts a handoff of the user terminal according to the satellite and beam transition table.

Figure 17:
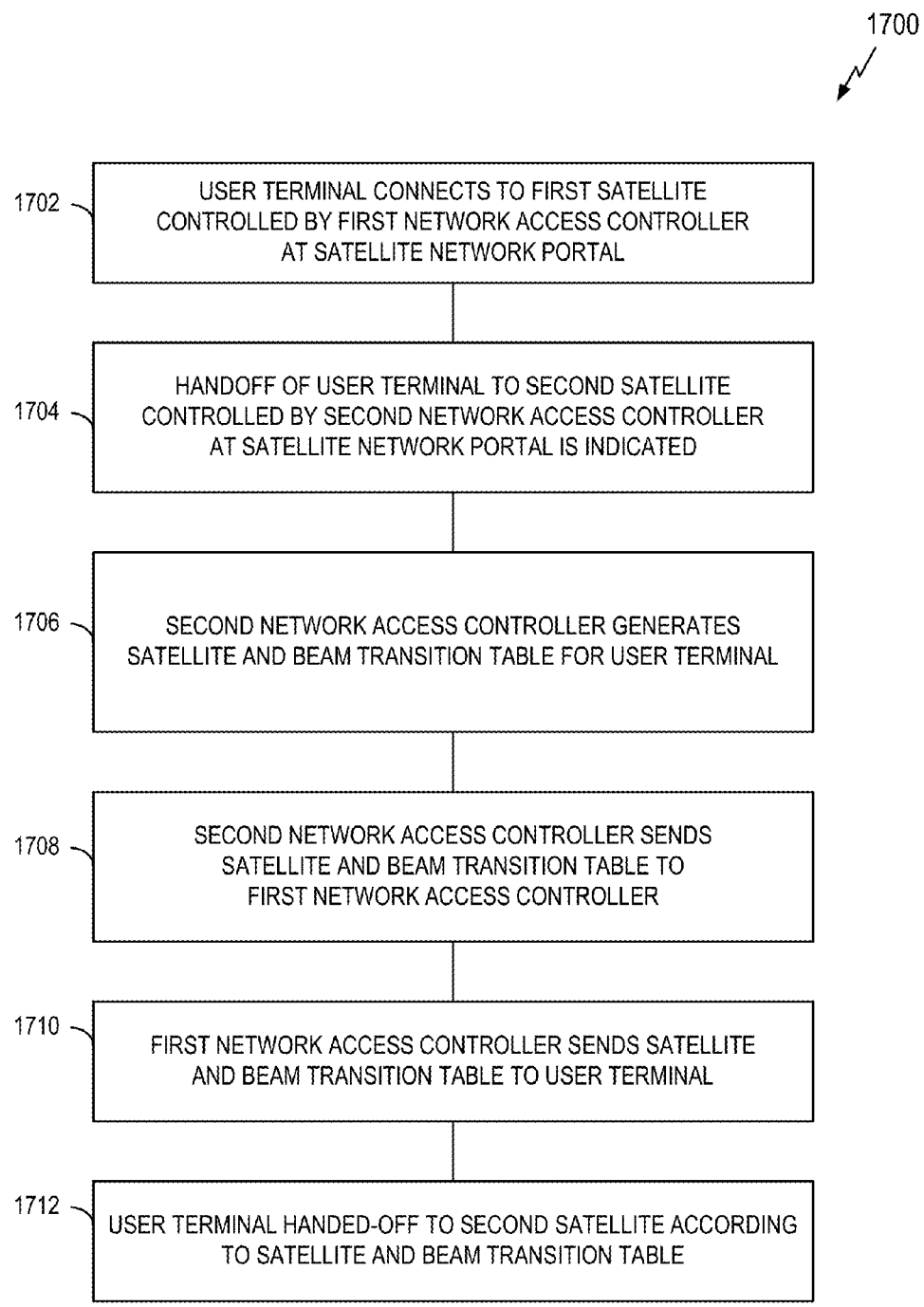
FIG. 17 is a diagram illustrating another example of inter-satellite handoff signaling in accordance with some aspects of the disclosure.

FIG. 17 is a diagram illustrating another example of an inter-satellite handoff signaling process 1700 in accordance with some aspects of the disclosure. The process 1700 may take place within a processing circuit which may be located in an SNP, a user terminal, or some other suitable apparatuses (devices). In some implementations, the process 1700 represents one or more operations performed by the SNP controller 250 of FIG. 2. In some implementations, the process 1700 represents one or more operations performed by the control processor 420 of FIG. 4. In some implementations, the process 1700 represents one or more operations performed by the apparatus 2000 of FIG. 20 (e.g., by the processing circuit 2010). In some implementations, the process 1700 represents one or more operations performed by the apparatus 2200 of FIG. 22 (e.g., by the processing circuit 2210). Of course, in various aspects within the scope of the disclosure, the process 1700 may be implemented by any suitable apparatuses capable of supporting communication-related operations.

At block 1702, a user terminal (or other suitable apparatus) connects to a first satellite controlled by a first NAC at an SNP.

At block 1704, handoff of the user terminal (or other suitable apparatus) to a second satellite controlled by a second NAC at the SNP is indicated.

At block 1706, the second NAC (or other suitable apparatus) generates a satellite and beam transition table for the user terminal.

At block 1708, the second NAC (or other suitable apparatus) sends the satellite and beam transition table to the first NAC.

At block 1710, the first NAC (or other suitable apparatus) sends the satellite and beam transition table to the user terminal.

At block 1712, the user terminal (or other suitable apparatus) is handed-off to a second satellite according to the satellite and beam transition table.

Figure 18:
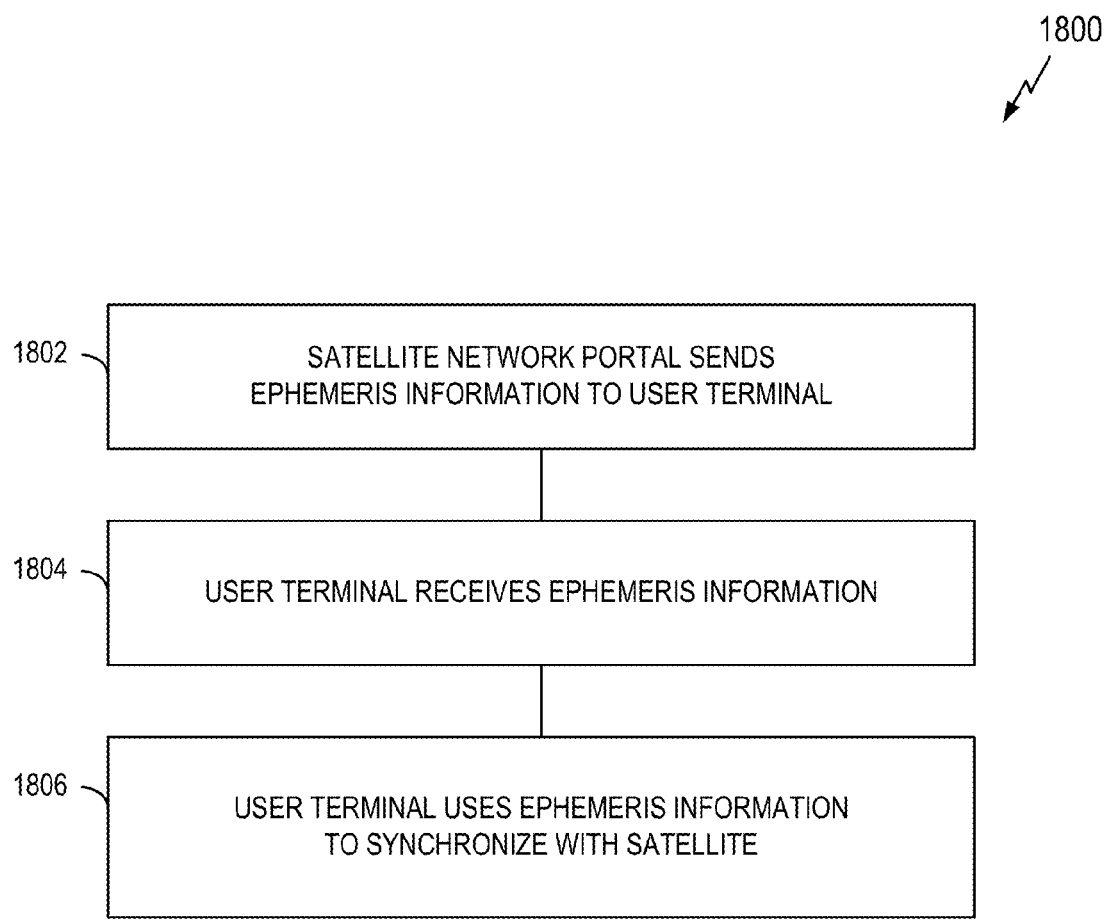
FIG. 18 is a diagram illustrating an example of signaling ephemeris information in accordance with some aspects of the disclosure.

FIG. 18 is a diagram illustrating an example of a process 1800 for signaling ephemeris information in accordance with some aspects of the disclosure. The process 1800 may take place within a processing circuit which may be located in an SNP, a user terminal, or some other suitable apparatuses (devices). In some implementations, the process 1800 represents one or more operations performed by the SNP controller 250 of FIG. 2. In some implementations, the process 1800 represents one or more operations performed by the control processor 420 of FIG. 4. In some implementations, the process 1800 represents one or more operations performed by the apparatus 2000 of FIG. 20 (e.g., by the processing circuit 2010). In some implementations, the process 1800 represents one or more operations performed by the apparatus 2200 of FIG. 22 (e.g., by the processing circuit 2210). Of course, in various aspects within the scope of the disclosure, the process 1800 may be implemented by any suitable apparatuses capable of supporting communication-related operations.

At block 1802, an SNP (or other suitable apparatus) sends ephemeris information to a user terminal.

At block 1804, the user terminal (or other suitable apparatus) receives the ephemeris information.

At block 1806, the user terminal (or other suitable apparatus) uses the ephemeris information to synchronize with a satellite.

Figure 19:
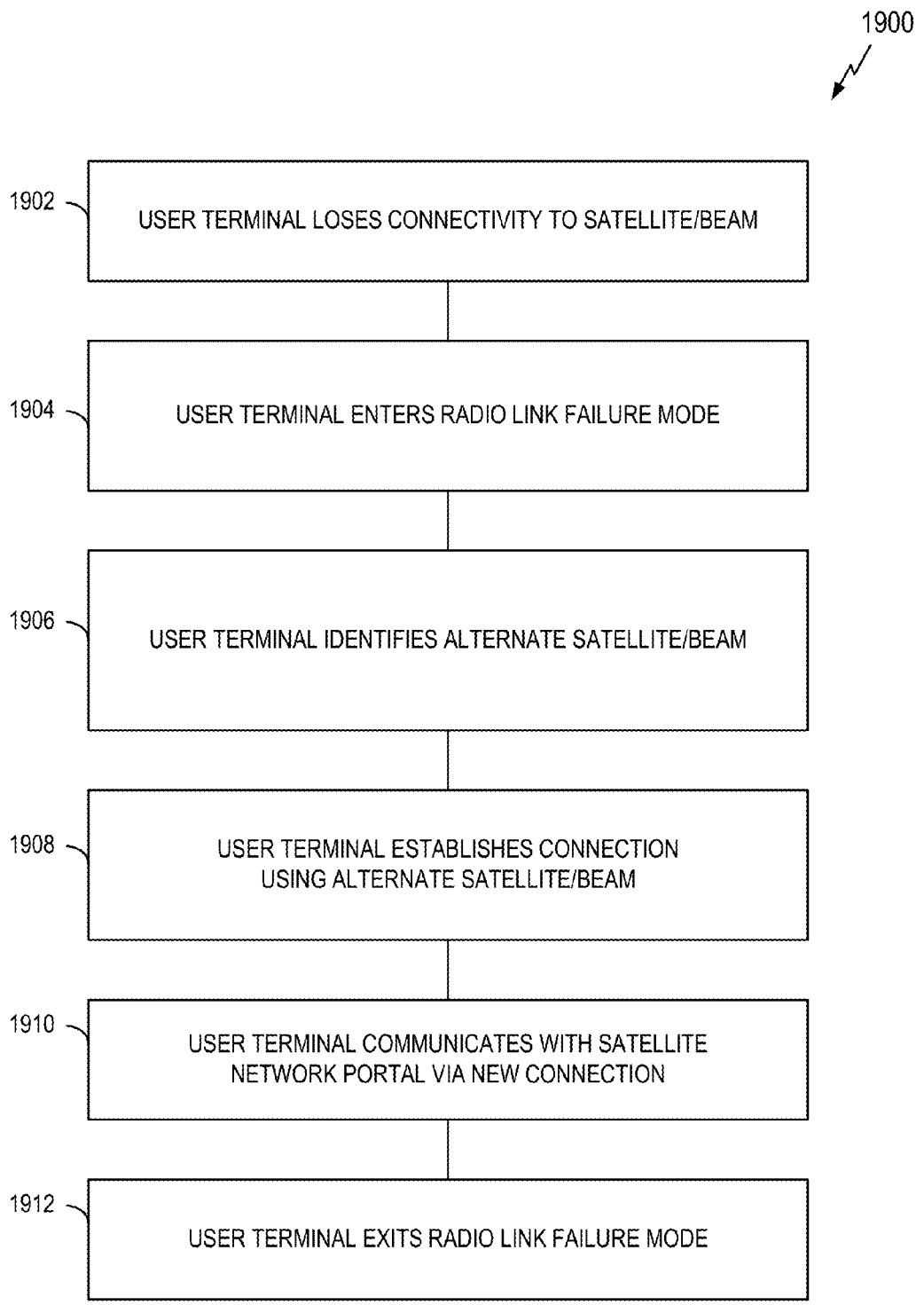
FIG. 19 is a diagram illustrating an example of radio link failure operations in accordance with some aspects of the disclosure.

FIG. 19 is a diagram illustrating an example of a radio link failure process 1900 in accordance with some aspects of the disclosure. The process 1900 may take place within a processing circuit which may be located in a user terminal or some other suitable apparatus (device). In some implementations, the process 1900 represents operations performed by the control processor 420 of FIG. 4. In some implementations, the process 1900 represents operations performed by the apparatus 2200 of FIG. 22 (e.g., by the processing circuit 2210). Of course, in various aspects within the scope of the disclosure, the process 1900 may be implemented by any suitable apparatus capable of supporting communication-related operations.

At block 1902, a user terminal (or other suitable apparatus) loses connectivity to a satellite and/or beam.

At block 1904, the user terminal (or other suitable apparatus) enters radio link failure mode.

At block 1906, the user terminal (or other suitable apparatus) identifies an alternate satellite and/or beam (e.g., based on ephemeris information stored at the user terminal).

At block 1908, the user terminal (or other suitable apparatus) establishes a connection using the alternate satellite and/or beam.

At block 1910, the user terminal (or other suitable apparatus) communicates with an SNP via the new connection.

At block 1912, the user terminal (or other suitable apparatus) exits radio link failure mode.

Example Apparatus

Figure 20:
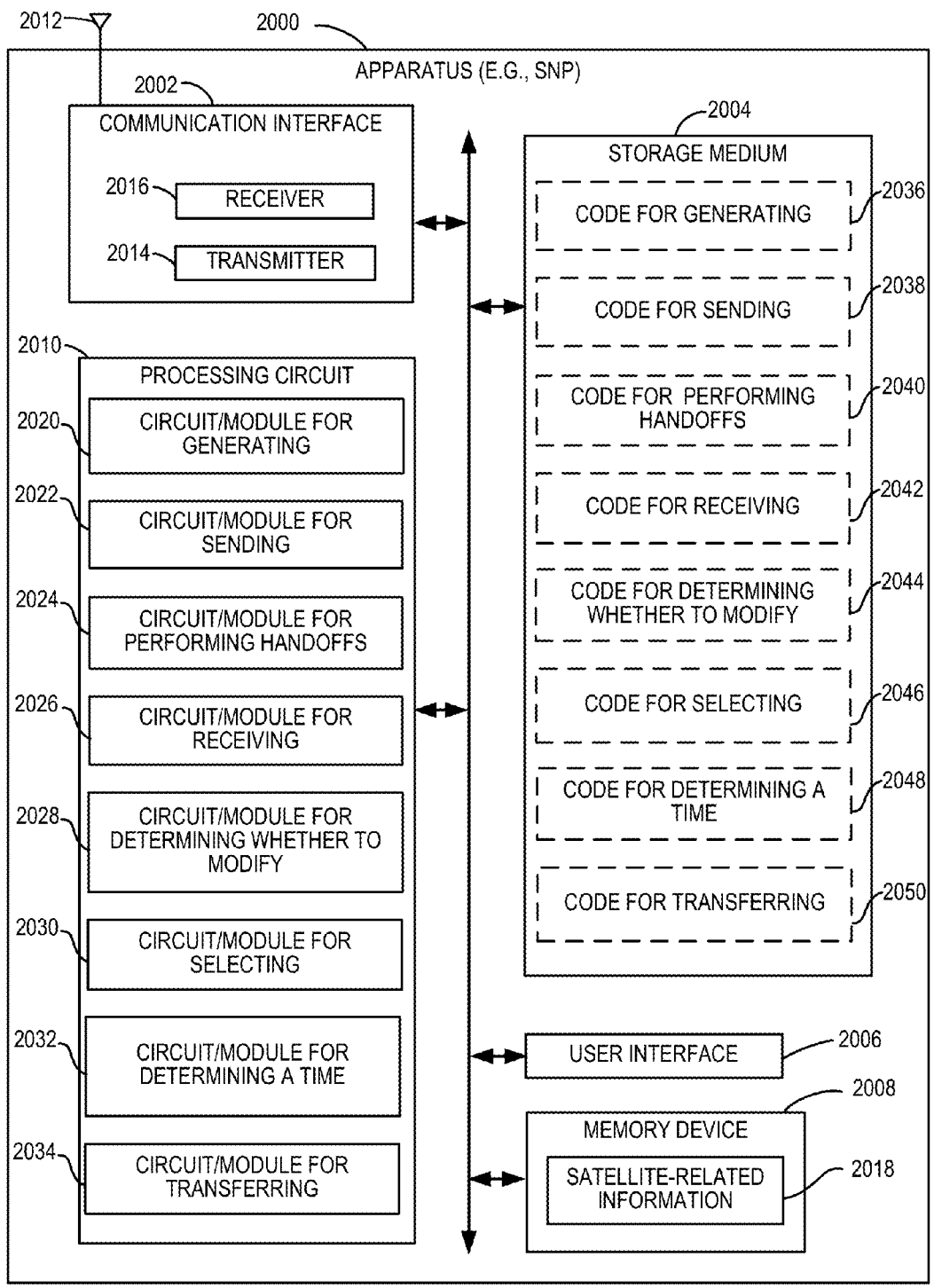
FIG. 20 is a block diagram illustrating an example hardware implementation for an apparatus (e.g., an electronic device) that can support satellite-related communication in accordance with some aspects of the disclosure.

FIG. 20 illustrates a block diagram of an example hardware implementation of an apparatus 2000 configured to communicate according to one or more aspects of the disclosure. For example, the apparatus 2000 could embody or be implemented within an SNP or some other type of device that supports satellite communication. Thus, in some aspects, the apparatus 2000 could be an example of the SNP 200 or the SNP 201 of FIG. 1. In various implementations, the apparatus 2000 could embody or be implemented within a gateway, a ground station, a vehicular component, or any other electronic device having circuitry.

The apparatus 2000 includes a communication interface (e.g., at least one transceiver) 2002, a storage medium 2004, a user interface 2006, a memory device (e.g., a memory circuit) 2008, and a processing circuit (e.g., at least one processor) 2010. In various implementations, the user interface 2006 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 20. The signaling bus may include any number of interconnecting buses and bridges depending on the specific application of the processing circuit 2010 and the overall design constraints. The signaling bus links together various circuits such that each of the communication interface 2002, the storage medium 2004, the user interface 2006, and the memory device 2008 are coupled to and/or in electrical communication with the processing circuit 2010. The signaling bus may also link various other circuits (not shown) such as timing sources, peripherals, voltage regulators, and power management circuits, which are well known in the art, and therefore, will not be described any further.

The communication interface 2002 provides a means for communicating with other apparatuses over a transmission medium. In some implementations, the communication interface 2002 includes circuitry and/or programming adapted to facilitate the communication of information bi-directionally with respect to one or more communication devices in a network. In some implementations, the communication interface 2002 is adapted to facilitate wireless communication of the apparatus 2000. In these implementations, the communication interface 2002 may be coupled to one or more antennas 2012 as shown in FIG. 20 for wireless communication within a wireless communication system. The communication interface 2002 can be configured with one or more standalone receivers and/or transmitters, as well as one or more transceivers. In the illustrated example, the communication interface 2002 includes a transmitter 2014 and a receiver 2016. The communication interface 2002 serves as one example of a means for receiving and/or means transmitting.

The memory device 2008 may represent one or more memory devices. As indicated, the memory device 2008 may maintain satellite-related information 2018 along with other information used by the apparatus 2000. In some implementations, the memory device 2008 and the storage medium 2004 are implemented as a common memory component. The memory device 2008 may also be used for storing data that is manipulated by the processing circuit 2010 or some other component of the apparatus 2000.

The storage medium 2004 may represent one or more computer-readable, machine-readable, and/or processor-readable devices for storing programming, such as processor executable code or instructions (e.g., software, firmware), electronic data, databases, or other digital information. The storage medium 2004 may also be used for storing data that is manipulated by the processing circuit 2010 when executing programming. The storage medium 2004 may be any available media that can be accessed by a general purpose or special purpose processor, including portable or fixed storage devices, optical storage devices, and various other mediums capable of storing, containing or carrying programming.

By way of example and not limitation, the storage medium 2004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 2004 may be embodied in an article of manufacture (e.g., a computer program product). By way of example, a computer program product may include a computer-readable medium in packaging materials. In view of the above, in some implementations, the storage medium 2004 may be a non-transitory (e.g., tangible) storage medium.

The storage medium 2004 may be coupled to the processing circuit 2010 such that the processing circuit 2010 can read information from, and write information to, the storage medium 2004. That is, the storage medium 2004 can be coupled to the processing circuit 2010 so that the storage medium 2004 is at least accessible by the processing circuit 2010, including examples where at least one storage medium is integral to the processing circuit 2010 and/or examples where at least one storage medium is separate from the processing circuit 2010 (e.g., resident in the apparatus 2000, external to the apparatus 2000, distributed across multiple entities, etc.).

Programming stored by the storage medium 2004, when executed by the processing circuit 2010, causes the processing circuit 2010 to perform one or more of the various functions and/or process operations described herein. For example, the storage medium 2004 may include operations configured for regulating operations at one or more hardware blocks of the processing circuit 2010, as well as to utilize the communication interface 2002 for wireless communication utilizing their respective communication protocols.

The processing circuit 2010 is generally adapted for processing, including the execution of such programming stored on the storage medium 2004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2010 is arranged to obtain, process and/or send data, control data access and storage, issue commands, and control other desired operations. The processing circuit 2010 may include circuitry configured to implement desired programming provided by appropriate media in at least one example. For example, the processing circuit 2010 may be implemented as one or more processors, one or more controllers, and/or other structure configured to execute executable programming. Examples of the processing circuit 2010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2010 are for illustration and other suitable configurations within the scope of the disclosure are also contemplated.

According to one or more aspects of the disclosure, the processing circuit 2010 may be adapted to perform any or all of the features, processes, functions, operations and/or routines for any or all of the apparatuses described herein. For example, the processing circuit 2010 may be configured to perform any of the steps, functions, and/or processes described with respect to FIGS. 7-9, 12, 14, and 16-18. As used herein, the term "adapted" in relation to the processing circuit 2010 may refer to the processing circuit 2010 being one or more of configured, employed, implemented, and/or programmed to perform a particular process, function, operation and/or routine according to various features described herein.

The processing circuit 2010 may be a specialized processor, such as an application specific integrated circuit (ASIC) that serves as a means for (e.g., structure for) carrying out any one of the operations described in conjunction with FIGS. 7-9, 12, 14, and 16-18. The processing circuit 2010 serves as one example of a means for transmitting and/or a means for receiving. In some implementations, the processing circuit 2010 incorporates the functionality of the SNP controller 250 of FIG. 2.

According to at least one example of the apparatus 2000, the processing circuit 2010 may include one or more of a circuit/module for generating 2020, a circuit/module for sending 2022, a circuit/module for performing handoffs 2024, a circuit/module for receiving 2026, a circuit/module for determining whether to modify 2028, a circuit/module for selecting 2030, a circuit/module for determining a time 2032, or a circuit/module for transferring 2034. In various implementations, the circuit/module for generating 2020, the circuit/module for sending 2022, the circuit/module for performing handoffs 2024, the circuit/module for receiving 2026, the circuit/module for determining whether to modify 2028, the circuit/module for selecting 2030, the circuit/module for determining a time 2032, and the circuit/module for transferring 2034 may correspond, at least in part, to the SNP controller 250 of FIG. 2.

The circuit/module for generating 2020 may include circuitry and/or programming (e.g., code for generating 2036 stored on the storage medium 2004) adapted to perform several functions relating to, for example, generating satellite and beam transition information that specifies a time to start and a time to terminate communication with a particular beam of a particular satellite. In some implementations, the circuit/module for generating 2020 calculates the information (e.g., the data for Table 1) based on satellite ephemeris data and user terminal location data. To this end, the circuit/module for generating 2020 collects this data, processes the data to generate the information and sends the information to a component of the apparatus 2000 (e.g., the memory device 2008). For example, for a given location of a user terminal, the circuit/module for generating 2020 can determine when a particular beam of a particular satellite will provide coverage for the user terminal based on the location of the satellite and the directionality and coverage of the beams of the satellite over time.

The circuit/module for sending 2022 may include circuitry and/or programming (e.g., code for sending 2038 stored on the storage medium 2004) adapted to perform several functions relating to, for example, sending information (e.g., data) to another apparatus. Initially, the circuit/module for sending 2022 obtains the information to be sent (e.g., from the memory device 2008, the circuit/module for generating 2020, or some other component). In various implementations, the information to be sent may include satellite and beam transition information to be sent to a user terminal. The circuit/module for sending 2022 may then format the information for sending (e.g., in a message, according to a protocol, etc.). The circuit/module for sending 2022 then causes the information to be sent via a wireless communication medium (e.g., via satellite signaling). To this end, the circuit/module for sending 2022 may send the data to the communication interface 2002 (e.g., a digital subsystem or an RF subsystem) or some other component for transmission. In some implementations, the communication interface 2002 includes the circuit/module for sending 2022 and/or the code for sending 2038.

The circuit/module for performing handoffs 2024 may include circuitry and/or programming (e.g., code for performing handoffs 2040 stored on the storage medium 2004) adapted to perform several functions relating to, for example, performing handoffs for a user terminal to different beams and at least one satellite. In some implementations, the circuit/module for performing handoffs 2024 identifies the target satellite and/or the target beam based on the satellite and beam transition information (e.g., Table 1). To this end, the circuit/module for performing handoffs 2024 collects this information, processes the information to identify the target, and reconfigures its communication parameters to cause communication with the user terminal to be conducted via the target. For example, for a given location of a user terminal, the circuit/module for performing handoffs 2024 can determine whether a particular beam of a particular satellite would provide sufficient coverage for the user terminal based on the location of the satellite and the directionality and coverage of the beams of the satellite over time. If the satellite/beam would provide sufficient coverage, the circuit/module for performing handoffs 2024 can designate that satellite/beam as the target for the handoff and commence handoff signaling accordingly.

The circuit/module for receiving 2026 may include circuitry and/or programming (e.g., code for receiving 2042 stored on the storage medium 2004) adapted to perform several functions relating to, for example, receiving information (e.g., data) from another apparatus. In various implementations, the information to be received may include a measurement message from a user terminal. Initially, the circuit/module for receiving 2026 obtains received information. For example, the circuit/module for receiving 2026 may obtain this information from a component of the apparatus 2000 (e.g., the communication interface 2002 (e.g., a digital subsystem or an RF subsystem), the memory device 2008, or some other component) or directly from a device (e.g., a satellite) that relayed the information from the user terminal. In some implementations, the circuit/module for receiving 2026 identifies a memory location of a value in the memory device 2008 and invokes a read of that location. In some implementations, the circuit/module for receiving 2026 processes (e.g., decodes) the received information. The circuit/module for receiving 2026 outputs the received information (e.g., stores the received information in the memory device 2008 or sends the information to another component of the apparatus 2000). In some implementations, the communication interface 2002 includes the circuit/module for receiving 2026 and/or the code for receiving 2042.

The circuit/module for determining whether to modify 2028 may include circuitry and/or programming (e.g., code for determining whether to modify 2044 stored on the storage medium 2004) adapted to perform several functions relating to, for example, determining whether to modify the satellite and beam transition information. In some implementations, the circuit/module for determining whether to modify 2028 makes this determination based on the received measurement message. To this end, the circuit/module for determining whether to modify 2028 collects this measurement message information (e.g., from the circuit/module for receiving 2026, the memory device 2008, or some other component of the apparatus 2000). The circuit/module for determining whether to modify 2028 may then process the information to determine whether the current timing parameters need to be changed (e.g., due to poor RF conditions or improved RF conditions). For example, the circuit/module for determining whether to modify 2028 may compare signal quality information contained in a measurement message with one or more signal quality thresholds. Finally, the circuit/module for determining whether to modify 2028 generates an indication of this determination (e.g., indicative of advancement of a handoff or delay of a handoff).

The circuit/module for selecting 2030 may include circuitry and/or programming (e.g., code for selecting 2046 stored on the storage medium 2004) adapted to perform several functions relating to, for example, selecting a handoff procedure for a user terminal. In some implementations, the circuit/module for selecting 2030 makes this determination based on capability information received from the user terminal. To this end, the circuit/module for selecting 2030 collects this capability information, processes the information to identify a handoff procedure, and generates an indication of this determination. For example, the selection of the handoff procedure may involve determining whether the user terminal is dual sense capable, and enabling or disabling monitoring for a measurement message from the user terminal based on whether the user terminal is dual sense capable. Thus, in some implementations, the circuit/module for selecting 2030 acquires configuration information about the user terminal (e.g., from the memory device 2008, from the receiver 2016, or from some other component), checks this information to identify the capability of the user terminal to select a supported handoff procedure, and generates an indication of this determination (e.g., that is sent to the memory device 2008, the circuit/module for performing handoffs 2024, or some other component).

The circuit/module for determining a time 2032 may include circuitry and/or programming (e.g., code for determining a time 2048 stored on the storage medium 2004) adapted to perform several functions relating to, for example, determining a time of handoff of a user terminal. In some implementations, the circuit/module for determining a time 2032 makes this determination based on the satellite and beam transition information (e.g., Table 1). To this end, the circuit/module for determining a time 2032 acquires this information (e.g., from the circuit/module for receiving 2026, the memory device 2008, or some other component of the apparatus 2000). The circuit/module for a time 2032 may then process the information to determine the time (e.g., the frame number) for the next handoff of the user terminal. For example, the circuit/module for a time 2032 may compare a current time indication (e.g., a frame number) with the timing indications in Table 1. The circuit/module for determining a time 2032 generates an indication of this determination (e.g., indicative of the time of handoff) and sends the indication to a component of the apparatus 2000 (e.g., the circuit/module for transferring 2034, the memory device 2008, or some other component).

The circuit/module for transferring 2034 may include circuitry and/or programming (e.g., code for transferring 2050 stored on the storage medium 2004) adapted to perform several functions relating to, for example, transferring user queues prior to handoff. Initially, the circuit/module for transferring 2034 receives an indication of a time of handoff (e.g., from the memory device 2008, the circuit/module for determining a time 2032, or some other component). Next, prior to the time of handoff, the circuit/module for transferring 2034 obtains queue information to be sent (e.g., from the memory device 2008, or some other component). In various implementations, this information may be sent to another SNP. The circuit/module for transferring 2034 may then format the queue information for sending (e.g., in a message, according to a protocol, etc.). The circuit/module for transferring 2034 then causes the queue information to be sent via an appropriate communication medium (e.g., via the infrastructure 106 of FIG. 1). To this end, the circuit/module for transferring 2034 may send the data to the communication interface 2002 or some other component for transmission. In some implementations, the communication interface 2002 includes the circuit/module for transferring 2034 and/or the code for transferring 2050.

As mentioned above, programming stored by the storage medium 2004, when executed by the processing circuit 2010, causes the processing circuit 2010 to perform one or more of the various functions and/or process operations described herein. For example, the programming, when executed by the processing circuit 2010, may cause the processing circuit 2010 to perform the various functions, steps, and/or processes described herein with respect to FIGS. 7-9, 12, 14, and 16-18 in various implementations. As shown in FIG. 20, the storage medium 2004 may include one or more of the code for generating 2036, the code for sending 2038, the code for performing handoffs 2040, the code for receiving 2042, the code for determining whether to modify 2044, the code for selecting 2046, the code for determining a time 2048, or the code for transferring 2050.

Example Process

Figure 21:
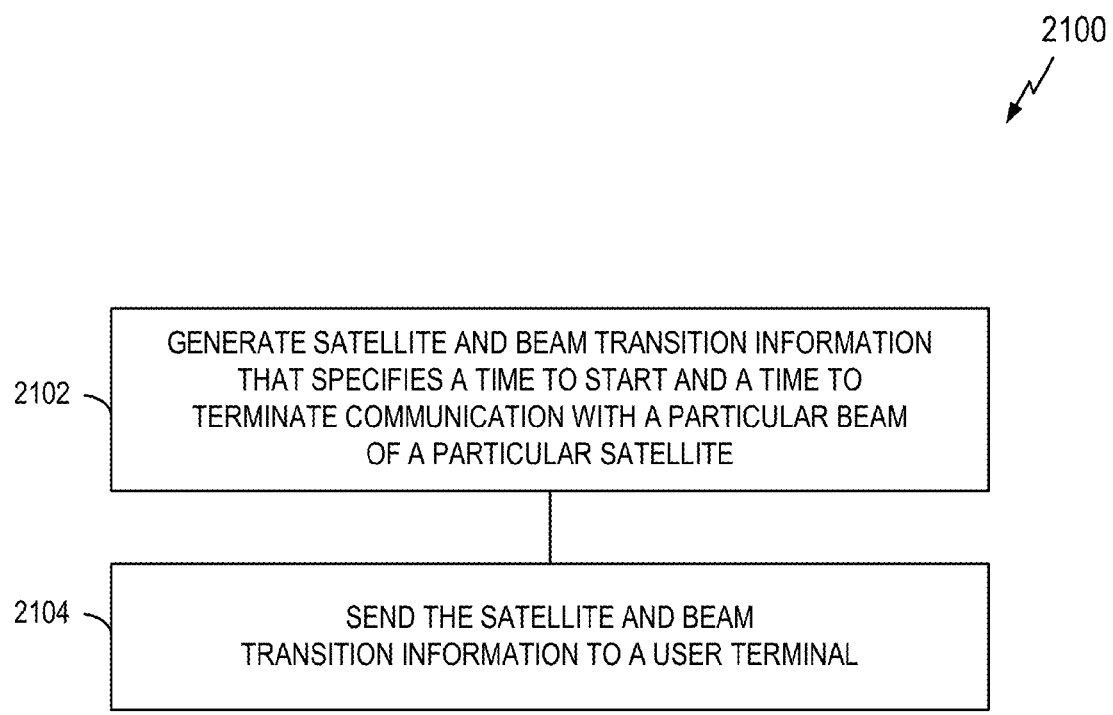
FIG. 21 is a flowchart illustrating an example of a process involving generation of satellite and beam transition information in accordance with some aspects of the disclosure.

FIG. 21 illustrates a process 2100 for communication in accordance with some aspects of the disclosure. The process 2100 may take place within a processing circuit (e.g., the processing circuit 2010 of FIG. 20), which may be located in an SNP or some other suitable apparatus. In some implementations, the process 2100 may be performed by an SNP for at least one non-geosynchronous satellite. In some implementations, the process 2100 represents operations performed by the SNP controller 250 of FIG. 2. Of course, in various aspects within the scope of the disclosure, the process 2100 may be implemented by any suitable apparatus capable of supporting communication operations.

At block 2102, an apparatus (e.g., an SNP) generates satellite and beam transition information that specifies a time to start and a time to terminate communication with a particular beam of a particular satellite. In some aspects, the operations of block 2102 may correspond to the operations of block 906 of FIG. 9.

In some aspects, the satellite and beam transition information is generated based on at least one of: capabilities information for the user terminal, location information for the user terminal, ephemeris information, or a restriction due to an incumbent system. In some aspects, the capabilities information indicates at least one of: whether the user terminal can sense multiple beams, whether the user terminal can sense multiple satellites, an inter-beam tune time for the user terminal, or an inter-satellite tune time for the user terminal. In some aspects, the location information includes a current location for the user terminal or a motion vector for the user terminal.

In some aspects, the generation of the satellite and beam transition information is triggered based on at least one of: handoff of the user terminal to a different satellite, or receipt of a measurement message from the user terminal.

In some implementations, the circuit/module for generating 2020 of FIG. 20 performs the operations of block 2102. In some implementations, the code for generating 2036 of FIG. 20 is executed to perform the operations of block 2102.

At block 2104, the apparatus sends the satellite and beam transition information to a user terminal. In some aspects, this information is sent via a satellite. In some aspects, the operations of block 2104 may correspond to the operations of block 908 of FIG. 9.

In some implementations, the circuit/module for sending 2022 of FIG. 20 performs the operations of block 2104. In some implementations, the code for sending 2038 of FIG. 20 is executed to perform the operations of block 2104.

In some aspects, the process 2100 further includes performing handoffs for the user terminal to different beams and at least one satellite based on the satellite and beam transition information. In some aspects, these operations may correspond to the operations of block 910 of FIG. 9. In some implementations, the circuit/module for performing handoffs 2024 of FIG. 20 performs these operations. In some implementations, the code for performing handoffs 2040 of FIG. 20 is executed to perform these operations.

In some aspects, the process 2100 further includes receiving a measurement message from the user terminal; and determining, based on the measurement message, whether to modify the satellite and beam transition information. In some aspects, the modification of the satellite and beam transition information includes advancing a handoff or delaying a handoff. In some aspects, these operations may correspond to the operations of blocks 1602 and 1604 of FIG. 16. In some implementations, the circuit/module for receiving 2026 and/or the circuit/module for determining whether to modify 2028 of FIG. 20 performs these operations. In some implementations, the code for receiving 2042 and/or the code for determining whether to modify 2044 of FIG. 20 is executed to perform these operations.

In some aspects, the process 2100 further includes selecting a handoff procedure for the user terminal based on capability information received from the user terminal. In some aspects, the selection of the handoff procedure includes enabling or disabling monitoring for a measurement message from the user terminal based on whether the user terminal is dual sense capable. In some aspects, these operations may correspond to the operations of block 1206 of FIG. 12. In some implementations, the circuit/module for selecting 2030 of FIG. 20 performs these operations. In some implementations, the code for selecting 2046 of FIG. 20 is executed to perform these operations.

In some aspects, the process 2100 further includes determining a time of a handoff of the user terminal and transferring user queues prior to the handoff. In some implementations, the circuit/module for determining a time 2032 and/or the circuit/module for transferring 2034 of FIG. 20 performs these operations. In some implementations, the code for determining a time 2048 and/or the code for transferring 2050 of FIG. 20 is executed to perform these operations.

Example Apparatus

Figure 22:
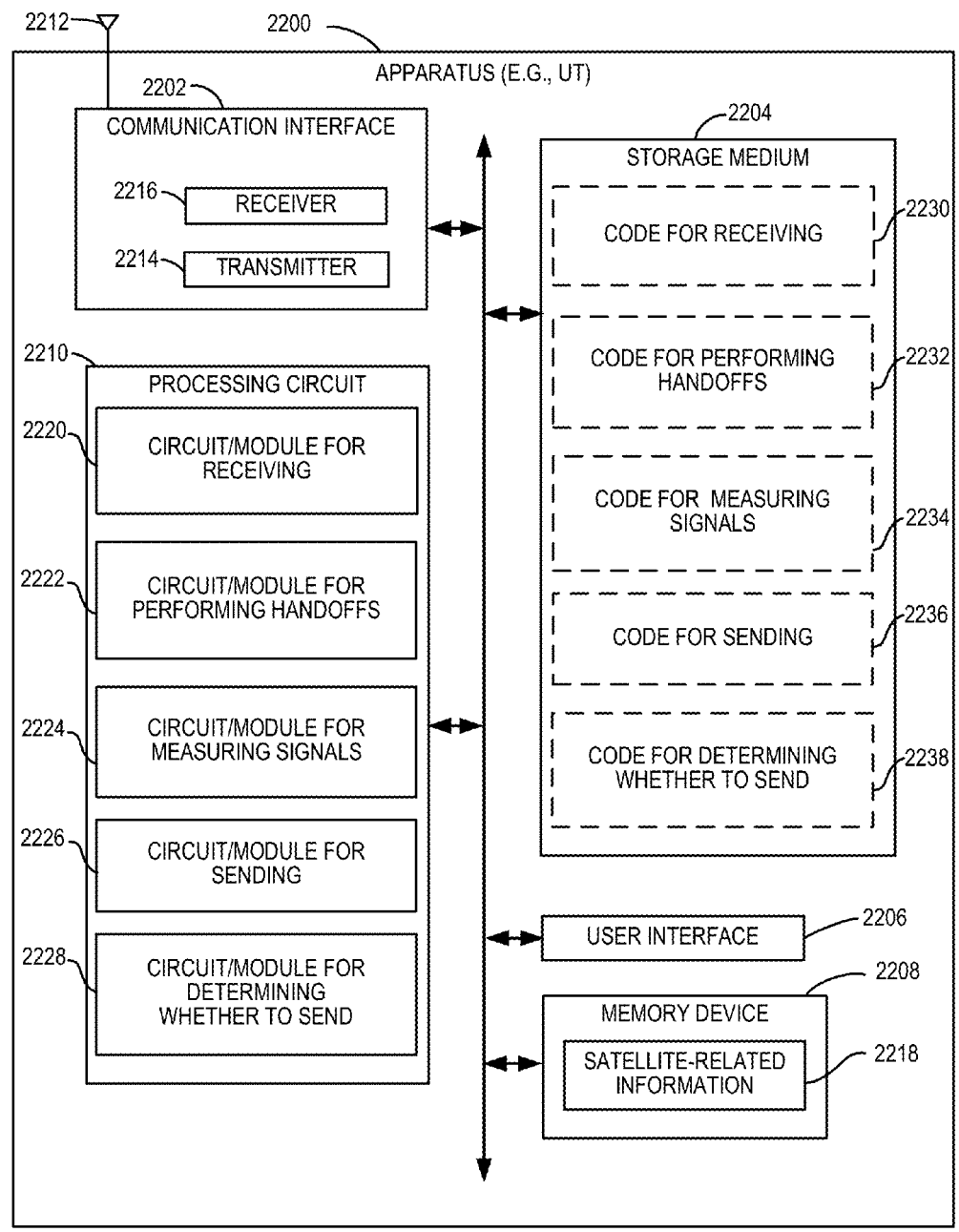
FIG. 22 is a block diagram illustrating an example hardware implementation for another apparatus (e.g., an electronic device) that can support satellite-related communication in accordance with some aspects of the disclosure.

FIG. 22 illustrates a block diagram of an example hardware implementation of another apparatus 2200 configured to communicate according to one or more aspects of the disclosure. For example, the apparatus 2200 could embody or be implemented within a UT or some other type of device that supports wireless communication. Thus, in some aspects, the apparatus 2200 could be an example of the UT 400 or the UT 401 of FIG. 1. In various implementations, the apparatus 2200 could embody or be implemented within a mobile phone, a smart phone, a tablet, a portable computer, a server, a personal computer, a sensor, an entertainment device, a vehicular component, medical devices, or any other electronic device having circuitry.

The apparatus 2200 includes a communication interface (e.g., at least one transceiver) 2202, a storage medium 2204, a user interface 2206, a memory device 2208 (e.g., storing satellite-related information 2218), and a processing circuit (e.g., at least one processor) 2210. In various implementations, the user interface 2206 may include one or more of: a keypad, a display, a speaker, a microphone, a touchscreen display, of some other circuitry for receiving an input from or sending an output to a user. The communication interface 2202 may be coupled to one or more antennas 2212, and may include a transmitter 2214 and a receiver 2216. In general, the components of FIG. 22 may be similar to corresponding components of the apparatus 2000 of FIG. 20.

According to one or more aspects of the disclosure, the processing circuit 2210 may be adapted to perform any or all of the features, processes, functions, operations and/or routines for any or all of the apparatuses described herein. For example, the processing circuit 2210 may be configured to perform any of the steps, functions, and/or processes described with respect to FIGS. 7, 8, 10, 11, 13, 15, and 17-19. As used herein, the term "adapted" in relation to the processing circuit 2210 may refer to the processing circuit 2210 being one or more of configured, employed, implemented, and/or programmed to perform a particular process, function, operation and/or routine according to various features described herein.

The processing circuit 2210 may be a specialized processor, such as an application specific integrated circuit (ASIC) that serves as a means for (e.g., structure for) carrying out any one of the operations described in conjunction with FIGS. 7, 8, 10, 11, 13, 15, and 17-19. The processing circuit 2210 serves as one example of a means for transmitting and/or a means for receiving. In various implementations, the processing circuit 2210 may incorporate the functionality of the control processor 420 of FIG. 4.

According to at least one example of the apparatus 2200, the processing circuit 2210 may include one or more of a circuit/module for receiving 2220, a circuit/module for performing handoffs 2222, a circuit/module for measuring signals 2224, a circuit/module for sending 2226, or a circuit/module for determining whether to send 2228. In various implementations, the circuit/module for receiving 2220, the circuit/module for performing handoffs 2222, the circuit/module for measuring signals 2224, the circuit/module for sending 2226, and the circuit/module for determining whether to send 2228 may correspond, at least in part, to the control processor 420 of FIG. 4.

The circuit/module for receiving 2220 may include circuitry and/or programming (e.g., code for receiving 2230 stored on the storage medium 2204) adapted to perform several functions relating to, for example, receiving information (e.g., data) from another apparatus. In various implementations, the information to be received may include satellite and beam transition information that specifies a time to start and a time to terminate communication with a particular beam of a particular satellite. Initially, the circuit/module for receiving 2220 obtains received information. For example, the circuit/module for receiving 2220 may obtain this information from a component of the apparatus 2200 or directly from a device (e.g., a satellite) that relayed the information from an SNP. In the former case, the circuit/module for receiving 2220 may obtain this information from the communication interface 2202 (e.g., a UT transceiver as described above for the UT 400 of FIG. 4), the memory device 2208, or some other component. In some implementations, the circuit/module for receiving 2220 identifies a memory location of a value in the memory device 2208 and invokes a read of that location. In some implementations, the circuit/module for receiving 2220 processes (e.g., decodes) the received information. The circuit/module for receiving 2220 outputs the received information (e.g., sends the received information to the memory device 2208, the circuit/module for performing handoffs 2222, or some other component of the apparatus 2200). In some implementations, the communication interface 2202 includes the circuit/module for receiving 2220 and/or the code for receiving 2230.

The circuit/module for performing handoffs 2222 may include circuitry and/or programming (e.g., code for performing handoffs 2232 stored on the storage medium 2204) adapted to perform several functions relating to, for example, performing handoff to a particular beam of a particular satellite. In some implementations, the circuit/module for performing handoffs 2222 identifies a particular beam of a particular satellite based on satellite and beam transition information (e.g., Table 1). To this end, the circuit/module for performing handoffs 2222 collects this information, processes the information to identify the satellite and beam, and reconfigures its communication parameters to cause communication with an SNP to be conducted via the identified satellite and beam. For example, at a particular point in time, the circuit/module for performing handoffs 2222 can use the information in Table 1 to determine whether the user terminal should switch to a different satellite beam. As another example, triggers may be set up at beam/satellite transitions times (e.g., frame numbers) indicated in Table 1.

The circuit/module for measuring signals 2224 may include circuitry and/or programming (e.g., code for measuring signals 2224 stored on the storage medium 2204) adapted to perform several functions relating to, for example, receiving and processing signals from at least one satellite. Initially, the circuit/module for measuring signals 2224 receives signals. For example, the circuit/module for measuring signals 2224 may obtain signal information from a component of the apparatus 2200 or directly from a satellite that transmitted the signals. As an example of the former case, the circuit/module for measuring signals 2224 may obtain signal information from the communication interface 2202 (e.g., a UT transceiver as described above for the UT 400 of FIG. 4), the memory device 2208 (e.g., if the received signals have been digitized), or some other component of the apparatus 2200. The circuit/module for measuring signals 2224 then processes the received signals (e.g., to determine at least one signal quality of the signals). Finally, the circuit/module for measuring signals 2224 generates an indication of this measurement and sends the indication to the memory device 2208, the circuit/module for sending 2224, or some other component of the apparatus 2200. In some implementations, the communication interface 2202 includes the circuit/module for measuring signals 2224 and/or the code for measuring signals 2234.

The circuit/module for sending 2226 may include circuitry and/or programming (e.g., code for sending 2236 stored on the storage medium 2204) adapted to perform several functions relating to, for example, sending information (e.g., messages) to another apparatus. Initially, the circuit/module for sending 2226 obtains the information to be sent (e.g., from the memory device 2208, the circuit/module for measuring signals 2224, or some other component). In various implementations, the information to be sent may include a measurement message based on measured signals, a message including user terminal capability information, or a message including user terminal location information. The circuit/module for sending 2226 may format the information for sending (e.g., according to a message format, according to a protocol, etc.). The circuit/module for sending 2226 then causes the information to be sent via a wireless communication medium (e.g., via satellite signaling). To this end, the circuit/module for sending 2226 may send the data to the communication interface 2202 (e.g., a UT transceiver as described above for the UT 400 of FIG. 4) or some other component for transmission. In some implementations, the communication interface 2202 includes the circuit/module for sending 2226 and/or the code for sending 2236.

The circuit/module for determining whether to send 2228 may include circuitry and/or programming (e.g., code for determining whether to send 2238 stored on the storage medium 2204) adapted to perform several functions relating to, for example, determining whether to send a message. In some implementations, the information to be sent may include a measurement message that is based on measured signals. Initially, the circuit/module for determining whether to send 2228 obtains information that is used to make a send decision (e.g., from the memory device 2208, the circuit/module for measuring signals 2224, or some other component). For example, the circuit/module for determining whether to send 2228 may obtain signal quality information from the circuit/module for measuring signals 2224. In this case, the circuit/module for determining whether to send 2228 may determine whether the signals from a current serving satellite and/or from a target satellite are inadequate (e.g., by comparing the signal quality information with a signal quality threshold). For example, the sending of a measurement message may be triggered if the signals are inadequate. Finally, the circuit/module for determining whether to send 2228 generates an indication of the determination and sends the indication to the memory device 2208, the circuit/module for sending 2226, or some other component of the apparatus 2200.

As mentioned above, programming stored by the storage medium 2204, when executed by the processing circuit 2210, causes the processing circuit 2210 to perform one or more of the various functions and/or process operations described herein. For example, the programming, when executed by the processing circuit 2210, may cause the processing circuit 2210 to perform the various functions, steps, and/or processes described herein with respect to FIGS. 7, 8, 10, 11, 13, 15, and 17-19 in various implementations. As shown in FIG. 22, the storage medium 2204 may include one or more of the code for receiving 2230, the code for performing handoffs 2232, the code for measuring signals 2234, the code for sending 2236, or the code for determining whether to send 2238.

Example Process

Figure 23:
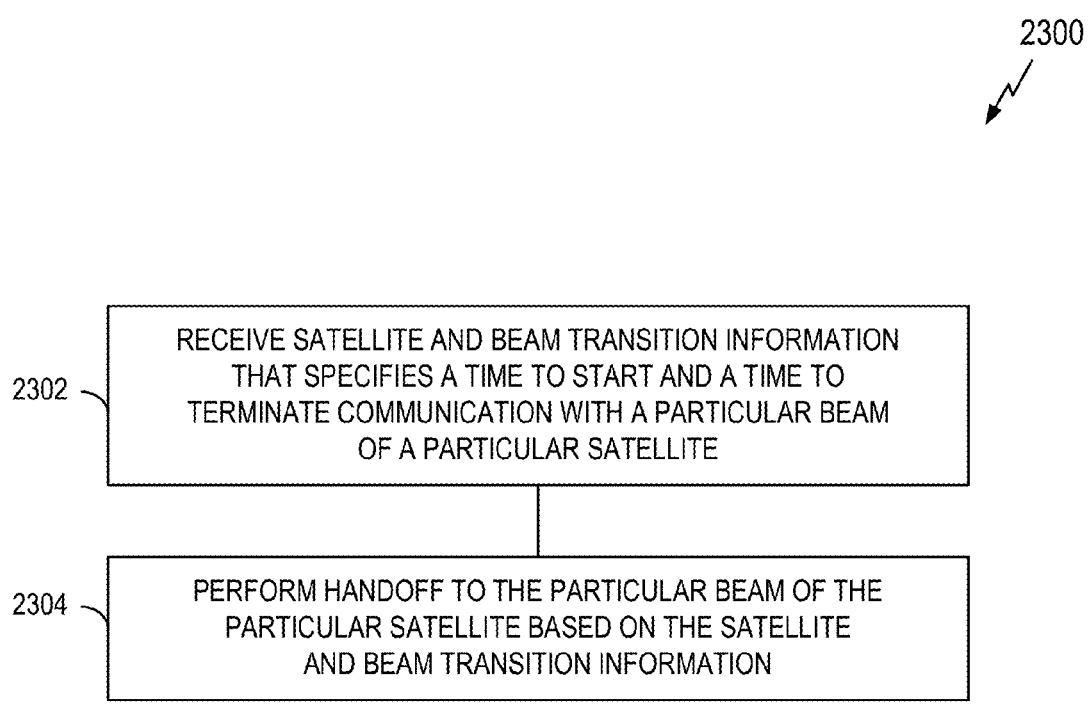
FIG. 23 is a flowchart illustrating an example of a process involving handoff in accordance with some aspects of the disclosure.

FIG. 23 illustrates a process 2300 for communication in accordance with some aspects of the disclosure. The process 2300 may take place within a processing circuit (e.g., the processing circuit 2210 of FIG. 22), which may be located in a UT or some other suitable apparatus. In some implementations, the process 2300 represents operations performed by the control processor 420 of FIG. 4. Of course, in various aspects within the scope of the disclosure, the process 2300 may be implemented by any suitable apparatus capable of supporting communication operations.

At block 2302, an apparatus (e.g., a UT) receives satellite and beam transition information that specifies a time to start and a time to terminate communication with a particular beam of a particular satellite. In some aspects, the operations of block 2302 may correspond to the operations of block 1004 of FIG. 10.

In some implementations, the circuit/module for receiving 2220 of FIG. 22 performs the operations of block 2302. In some implementations, the code for receiving 2230 of FIG. 22 is executed to perform the operations of block 2302.

At block 2304, the apparatus performs handoff to the particular beam of the particular satellite based on the satellite and beam transition information. In some aspects, the operations of block 2304 may correspond to the operations of block 1006 of FIG. 10.

In some implementations, the circuit/module for performing handoffs 2222 of FIG. 22 performs the operations of block 2304. In some implementations, the code for performing handoffs 2232 of FIG. 22 is executed to perform the operations of block 2304.

In some aspects, the process 2300 further includes: measuring signals from at least one satellite; and sending a measurement message based on the measured signals, wherein the satellite and beam transition information is received as a result of sending the measurement message. In some aspects, the measurement message includes at least one of: measurement data, a request to advance handoff timing, or a request to delay handoff timing. In some aspects, the process 2300 further includes determining whether to send the measurement message based on at least one of: whether signals from a current serving satellite are inadequate, or whether signals from a target satellite are inadequate. In some aspects, these operations may correspond to the operations of blocks 1504-1508 of FIG. 15. In some implementations, the circuit/module for measuring signals 2222 and/or the circuit/module for determining whether to send 2228 of FIG. 22 performs these operations. In some implementations, the code for measuring signals 2234 and/or the code for determining whether to send 2238 of FIG. 22 is executed to perform these operations.

In some aspects, the process 2300 further includes sending a message including user terminal capability information, wherein the satellite and beam transition information is based on the user terminal capability information. In some aspects, the user terminal capability information indicates at least one of: whether a user terminal can sense multiple beams, whether a user terminal can sense multiple satellites, a user terminal inter-beam tune time, or a user terminal inter-satellite tune time. In some aspects, the sending of the message including user terminal capability information is triggered as a result of an initial connection to a satellite. In some aspects, these operations may correspond to the operations of blocks 1102-1106 of FIG. 11. In some implementations, the circuit/module for sending 2226 of FIG. 22 performs these operations. In some implementations, the code for sending 2236 of FIG. 22 is executed to perform these operations.

In some aspects, the process 2300 further includes sending a message including user terminal location information, wherein the satellite and beam transition information is based on the user terminal location information. In some aspects, the user terminal location information includes a current user terminal location or a user terminal motion vector. In some aspects, the sending of the message including user terminal location information is triggered as a result of at least one of: an initial connection to a satellite, whether a user terminal is beyond a geographical boundary, or whether an error bound has been exceeded. In some aspects, these operations may correspond to the operations of blocks 1302-1306 of FIG. 13. In some implementations, the circuit/module for sending 2226 of FIG. 22 performs these operations. In some implementations, the code for sending 2236 of FIG. 22 is executed to perform these operations.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

Accordingly, one aspect of the disclosure can include a computer readable media embodying a method for time or frequency synchronization in non-geosynchronous satellite communication systems. Accordingly, the disclosure is not limited to illustrated examples and any means for performing the functionality described herein are included in aspects of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
   receiving a first signal comprising capability information for a user terminal;
   generating satellite and beam transition information that specifies a time to start and a time to terminate communication with a particular beam of a particular satellite, wherein the generation of the satellite and beam transition information is based on the capability information for the user terminal; and
   sending a second signal comprising the satellite and beam transition information to the user terminal.

2. The method of claim 1, wherein the generation of the satellite and beam transition information is further based on at least one of: location information for the user terminal, ephemeris information, a restriction due to an incumbent system, or any combination thereof.

3. The method of claim 2, wherein the location information comprises a current location for the user terminal or a motion vector for the user terminal.

4. The method of claim 1, wherein the capability information indicates at least one of: whether the user terminal can sense multiple beams, whether the user terminal can sense multiple satellites, an inter-beam tune time for the user terminal, an inter-satellite tune time for the user terminal, or any combination thereof.

5. The method of claim 1, wherein the generation of the satellite and beam transition information is triggered based on at least one of: handoff of the user terminal to a different satellite, receipt of a measurement message from the user terminal, or any combination thereof.

6. The method of claim 1, further comprising:
   performing handoffs for the user terminal to different beams and at least one satellite based on the satellite and beam transition information.

7. The method of claim 1, further comprising:
   receiving a measurement message from the user terminal; and
   determining, based on the measurement message, whether to modify the satellite and beam transition information.

8. The method of claim 7, wherein the modification of the satellite and beam transition information comprises advancing a handoff or delaying a handoff.

9. The method of claim 1, further comprising:
   selecting a handoff procedure for the user terminal based on the capability information.

10. The method of claim 9, wherein the selection of the handoff procedure comprises enabling or disabling monitoring for a measurement message from the user terminal based on whether the user terminal is dual sense capable.

11. The method of claim 1, wherein the apparatus comprises a satellite network portal in communication with at least one non-geosynchronous satellite.

12. The method of claim 1, further comprising:
    determining a time of a handoff of the user terminal; and
    transferring user queues prior to the handoff.

13. An apparatus for communication comprising:
    a memory device; and
    a processing circuit coupled to the memory device and configured to:
      receive a first signal comprising capability information for a user terminal;
      generate satellite and beam transition information that specifies a time to start and a time to terminate communication with a particular beam of a particular satellite, wherein the generation of the satellite and beam transition information is based on the capability information for the user terminal; and
      send a second signal comprising the satellite and beam transition information to the user terminal.

14. The apparatus of claim 13, wherein the processing circuit is further configured to:
    generate the satellite and beam transition information based on at least one of: location information for the user terminal, ephemeris information, a restriction due to an incumbent system, or any combination thereof.

15. The apparatus of claim 13, wherein the capability information indicates at least one of: whether the user terminal can sense multiple beams, whether the user terminal can sense multiple satellites, an inter-beam tune time for the user terminal, an inter-satellite tune time for the user terminal, or any combination thereof.

16. The apparatus of claim 13, wherein the processing circuit is further configured to:
perform handoffs for the user terminal to different beams and at least one satellite based on the satellite and beam transition information.

17. The apparatus of claim 13, wherein the processing circuit is further configured to:
receive a measurement message from the user terminal; and
determine, based on the measurement message, whether to modify the satellite and beam transition information.

18. The apparatus of claim 17, wherein, to modify the satellite and beam transition information, the processing circuit is further configured to advance a handoff or delay a handoff.

19. The apparatus of claim 13, wherein the processing circuit is further configured to:
select a handoff procedure for the user terminal based on the capability information.

20. The apparatus of claim 19, wherein, to select the handoff procedure, the processing circuit is further configured to enable or disable whether the apparatus monitors for a measurement message from the user terminal based on whether the user terminal is dual sense capable.

21. The apparatus of claim 13, wherein the processing circuit is further configured to:
determine a time of a handoff of the user terminal; and
transfer user queues prior to the handoff.

22. An apparatus for communication comprising:
means for receiving a first signal comprising capability information for a user terminal;
means for generating satellite and beam transition information that specifies a time to start and a time to terminate communication with a particular beam of a particular satellite, wherein the generation of the satellite and beam transition information is based on the capability information for the user terminal; and
means for sending a second signal comprising the satellite and beam transition information to the user terminal.

23. The apparatus of claim 22, further comprising:
means for performing handoffs for the user terminal to different beams and at least one satellite based on the satellite and beam transition information.

24. The apparatus of claim 22, further comprising:
means for receiving a measurement message from the user terminal; and
means for determining, based on the measurement message, whether to modify the satellite and beam transition information.

25. The apparatus of claim 22, further comprising:
means for selecting a handoff procedure for the user terminal based on the capability information.

26. The apparatus of claim 22, further comprising:
means for determining a time of a handoff of the user terminal; and
means for transferring user queues prior to the handoff.

27. A non-transitory computer-readable medium storing computer-executable code for an apparatus, including code to:
receive a first signal comprising capability information for a user terminal;
generate satellite and beam transition information that specifies a time to start and a time to terminate communication with a particular beam of a particular satellite, wherein the generation of the satellite and beam transition information is based on the capability information for the user terminal; and
send a second signal comprising the satellite and beam transition information to the user terminal.

28. A method of communication, comprising:
sending a message comprising user terminal capability information;
receiving satellite and beam transition information that specifies a time to start and a time to terminate communication with a particular beam of a particular satellite, wherein the satellite and beam transition information is based on the user terminal capability information; and
performing handoff to the particular beam of the particular satellite based on the satellite and beam transition information.

29. The method of claim 28, further comprising:
measuring signals from at least one satellite; and
sending a measurement message based on the measured signals, wherein the satellite and beam transition information is received as a result of sending the measurement message.

30. The method of claim 29, wherein the measurement message comprises at least one of: measurement data, a request to advance handoff timing, or a request to delay handoff timing.

31. The method of claim 29, further comprising:
determining whether to send the measurement message based on at least one of: whether signals from a current serving satellite are inadequate, or whether signals from a target satellite are inadequate.

32. The method of claim 28, wherein the user terminal capability information indicates at least one of: whether a user terminal can sense multiple beams, whether a user terminal can sense multiple satellites, a user terminal inter-beam tune time, or a user terminal inter-satellite tune time.

33. The method of claim 28, wherein the sending of the message comprising user terminal capability information is triggered as a result of an initial connection to a satellite.

34. The method of claim 28, further comprising:
sending a message comprising user terminal location information, wherein the satellite and beam transition information is based on the user terminal location information.

35. The method of claim 34, wherein the user terminal location information comprises a current user terminal location or a user terminal motion vector.

36. The method of claim 34, wherein the sending of the message comprising user terminal location information is triggered as a result of at least one of: an initial connection to a satellite, whether a user terminal is beyond a geographical boundary, or whether an error bound has been exceeded.

37. An apparatus for communication comprising:
a memory device; and
a processing circuit coupled to the memory device and configured to:
send a message comprising user terminal capability information;
receive satellite and beam transition information that specifies a time to start and a time to terminate communication with a particular beam of a particular satellite, wherein the satellite and beam transition information is based on the user terminal capability information; and
perform handoff to the particular beam of the particular satellite based on the satellite and beam transition information.

38. The apparatus of claim 37, wherein the processing circuit is further configured to:

measure signals from at least one satellite; and send a measurement message based on the measured signals, wherein the satellite and beam transition information is received as a result of sending the measurement message.

39. The apparatus of claim 38, wherein the processing circuit is further configured to:

determine whether to send the measurement message based on at least one of: whether signals from a current serving satellite are inadequate, or whether signals from a target satellite are inadequate.

40. The apparatus of claim 37, wherein the user terminal capability information indicates at least one of: whether a user terminal can sense multiple beams, whether a user terminal can sense multiple satellites, a user terminal inter-beam tune time, or a user terminal inter-satellite tune time.

41. The apparatus of claim 37, wherein:

the processing circuit is further configured to send a message comprising user terminal location information; and the satellite and beam transition information is based on the user terminal location information.

42. The apparatus of claim 41, wherein the sending of the message comprising user terminal location information is triggered as a result of at least one of: an initial connection to a satellite, whether a user terminal is beyond a geographical boundary, or whether an error bound has been exceeded.

43. An apparatus for communication comprising:

means for sending a message comprising user terminal capability information;

means for receiving satellite and beam transition information that specifies a time to start and a time to terminate communication with a particular beam of a particular satellite, wherein the satellite and beam transition information is based on the user terminal capability information; and means for performing handoff to the particular beam of the particular satellite based on the satellite and beam transition information.

44. The apparatus of claim 43, further comprising:

means for measuring signals from at least one satellite; and means for sending a measurement message based on the measured signals, wherein the satellite and beam transition information is received as a result of sending the measurement message.

45. The apparatus of claim 44, further comprising:

means for determining whether to send the measurement message based on at least one of: whether signals from a current serving satellite are inadequate, or whether signals from a target satellite are inadequate.

46. The apparatus of claim 43, further comprising:

means for sending a message comprising user terminal location information, wherein the satellite and beam transition information is based on the user terminal location information.

47. A non-transitory computer-readable medium storing computer-executable code, including code to:

send a message comprising user terminal capability information;

receive satellite and beam transition information that specifies a time to start and a time to terminate communication with a particular beam of a particular satellite, wherein the satellite and beam transition information is based on the user terminal capability information; and perform handoff to the particular beam of the particular satellite based on the satellite and beam transition information.

* * * * *